United States Patent
Enokihara et al.

(10) Patent No.: US 6,819,472 B2
(45) Date of Patent: Nov. 16, 2004

(54) OPTICAL MODULATOR AND COMMUNICATIONS SYSTEM INCLUDING THE OPTICAL MODULATOR

(75) Inventors: Akira Enokihara, Nara (JP); Masahiro Kosaki, Moriguchi (JP); Hiroyoshi Yajima, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/452,953

(22) Filed: Jun. 2, 2003

(65) Prior Publication Data

US 2003/0223669 A1 Dec. 4, 2003

(30) Foreign Application Priority Data

Jun. 3, 2002 (JP) ........................................ 2002-161798

(51) Int. Cl.[7] .............................................. G02F 1/035
(52) U.S. Cl. ............................ 359/308; 359/285; 385/2
(58) Field of Search ................................ 359/308, 311, 359/285, 238, 245; 385/7, 11, 127; 372/23, 13

(56) References Cited

U.S. PATENT DOCUMENTS

| 5,400,416 | A | | 3/1995 | Enokihara et al. | |
|---|---|---|---|---|---|
| 5,530,777 | A | | 6/1996 | Enokihara et al. | |
| 5,724,459 | A | | 3/1998 | Banba et al. | |
| 6,522,793 | B1 | * | 2/2003 | Szilagyi et al. | ............... 385/2 |
| 2003/0103709 | A1 | * | 6/2003 | Grinberg et al. | ............... 385/2 |

FOREIGN PATENT DOCUMENTS

EP           0 444 805 A1    9/1991

OTHER PUBLICATIONS

Kawanishi, et al., "LiNbO$_3$ resonant–type optical modulator with double–stub structure", *Electronics Letters*, 37(20):1244–1246 (2001).

Roger Krähenbühl et al., "Investigations on Short–Path–Length High–Speed Optical Modulators in LiNbO$_3$ With Resonant–Type Electrodes", *Journal of Lightwave Technology*, vol. 19, No. 9, pp. 1287–1297, (2001).

H. Murata et al., "Quasi–velocity–matched guided–wave optical modulator with resonant electrodes for integrated ultrashort pulse generators", *Technical Digest*. Summaries of papers presented at the conference on lasers and electro–optics. Postconference Technical Digest, pp. 442–443, (2001).

D.–S. Kim et al., "Standing–wave EO phase modulator using non–periodic domain inversion for large modulation index", *Electronic Letters*, vol. 36, No. 3, pp. 230–232, (2000).

Kwok Wah Hui et al., "Electrode Optimization for High–Speed Traveling–Wave Integrated Optic Modulators", *Journal of Lightwave Technology*, vol. 16, No. 2, pp. 232–238, (1998).

* cited by examiner

Primary Examiner—Scott J. Sugarman
Assistant Examiner—Richard Hanig
(74) Attorney, Agent, or Firm—Akin Gump Strauss Hauer & Feld, LLP

(57) ABSTRACT

An optical modulator includes an optical waveguide, a modulating electrode, a conductive layer, an electric signal input section, and connector members. At least a portion of the optical waveguide is made of an electro-optic material. The modulating electrode includes a first conductor line and a second conductor line, which are coupled together electromagnetically, and applies a modulating electric field to a portion of the optical waveguide. The conductive layer forms a first microstrip line with the first conductor line and a second microstrip line with the second conductor line, respectively. Through the electric signal input section, an RF modulating signal is supplied to the modulating electrode. The connector members connect the first and second conductor lines together at both ends. In this optical modulator, the first and second conductor lines function as an odd-mode resonator for the RF modulating signal.

27 Claims, 18 Drawing Sheets

— ELECTRIC LINE OF FORCE
----- MAGNETIC LINE OF FORCE
*FIG.5A*  EVEN MODE
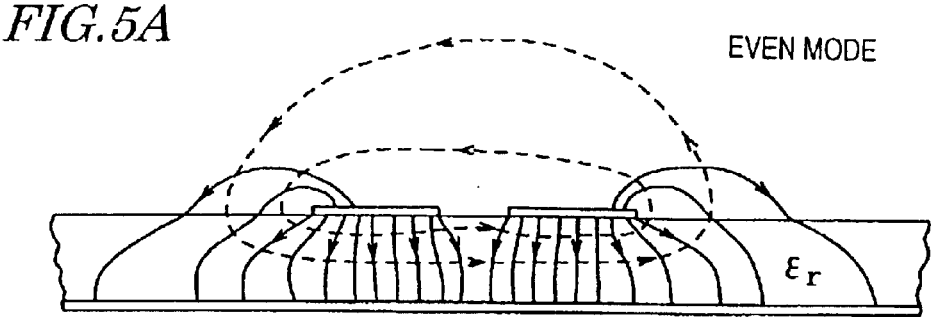
*FIG.5B*  ODD MODE
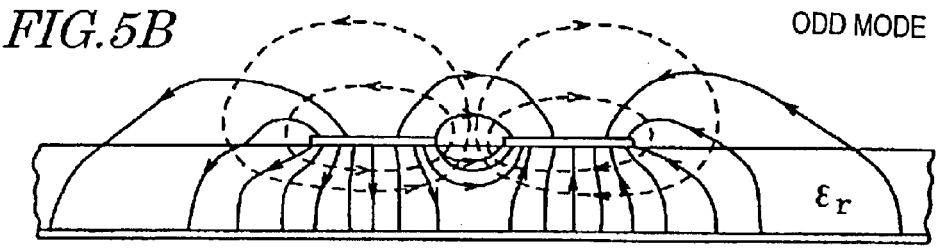
*FIG.6*
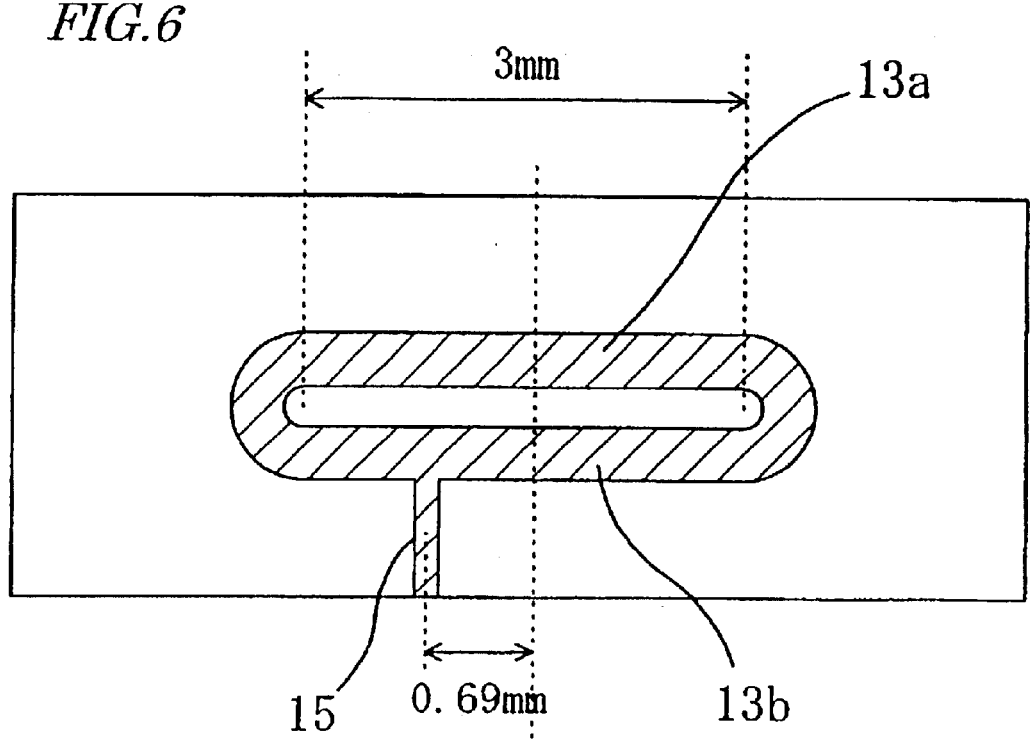

RESONATING AT 10 GHZ 3 mm

20 μm

50 μm 0.69 mm

INPUT LINE WITH A WIDTH OF 0.11 mm

RESONATING AT 26 GHZ 1.2 mm

20 μm

50 μm 0.54 mm

INPUT LINE WITH A WIDTH OF 0.11 mm

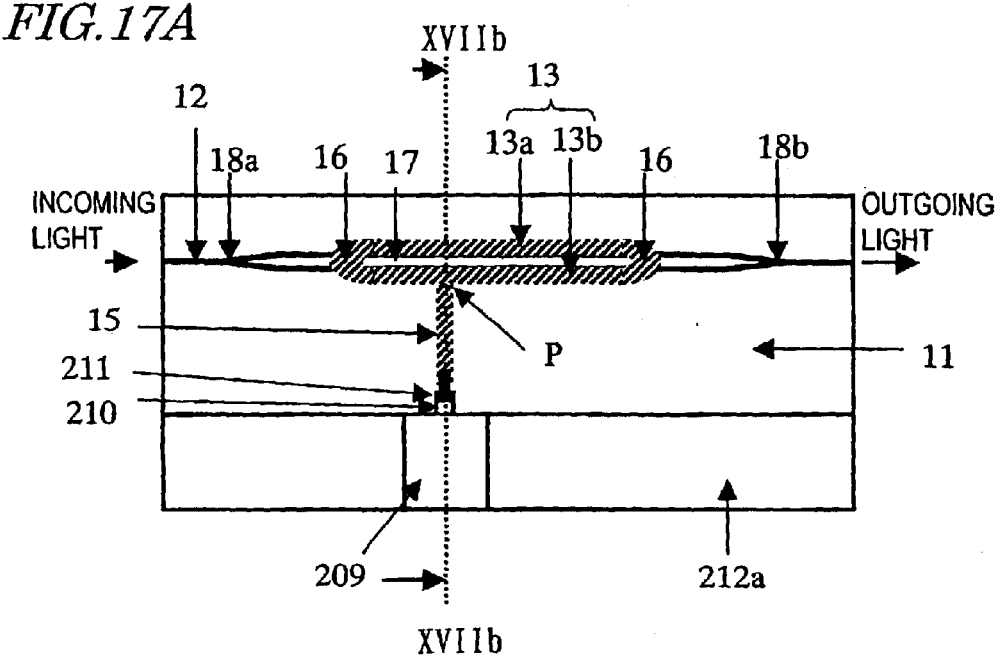
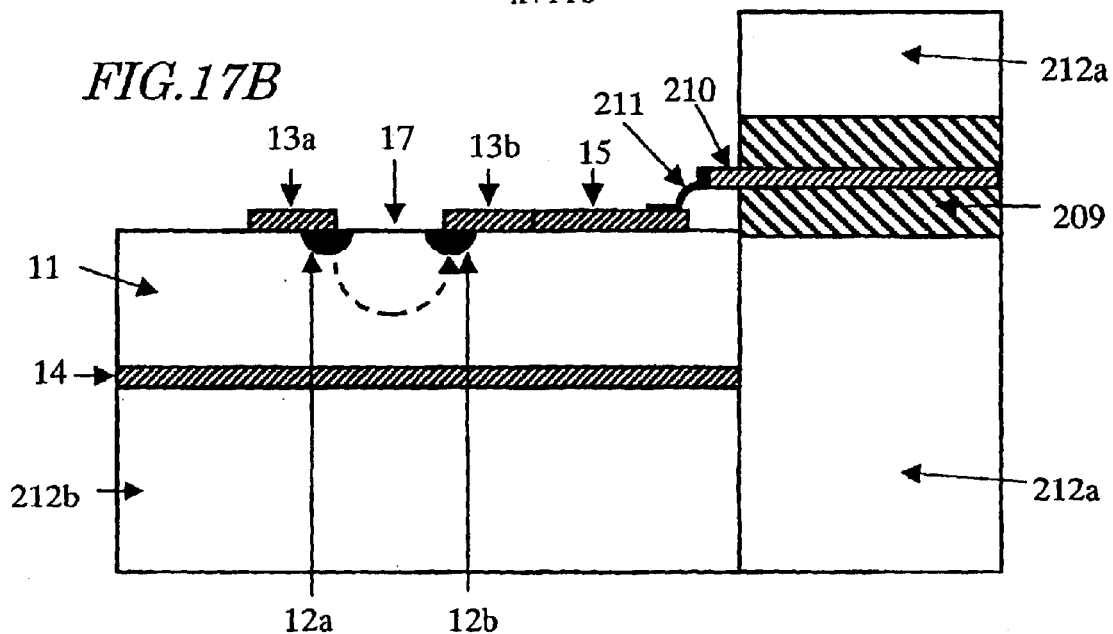
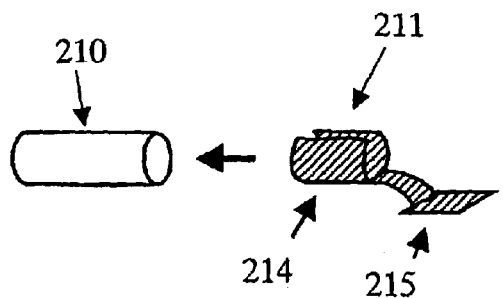

OPTICAL MODULATOR AND COMMUNICATIONS SYSTEM INCLUDING THE OPTICAL MODULATOR

BACKGROUND OF THE INVENTION

1. Field of the Invention

The present invention relates to an optical modulator and a communications system including the optical modulator. More particularly, the present invention relates to an optical modulator for use to transmit an RF signal having a frequency of several GHz or more by a lightwave communications technique and also relates to a communications system including such an optical modulator.

2. Description of the Related Art

A system for exchanging or processing information by using an optical signal needs to modulate the phase or intensity of light by means of an electric signal (e.g., an RF signal falling within the microwave or milliwave band). Light can be modulated for that purpose either by a direct modulation technique or by an external modulation technique.

The direct modulation technique is a method of changing the intensity of light that has been emitted from a light source (e.g., a semiconductor laser diode) by directly changing the amount of drive current being supplied to the light source as shown in FIG. 1A. The direct modulation technique contributes to reducing the overall size of a communications system because no modulators need to be provided outside of the light source. According to this method, however, it is difficult to modulate the light at a high frequency of several GHz or more. In addition, long distance fiber optics transmission can be carried out only under limited conditions due to a chirping phenomenon which is often observed in semiconductor laser radiation.

In the external modulation technique on the other hand, light that has been emitted from a light source such as a semiconductor laser diode (i.e., light with a stabilized output power) is input to an optical modulator, which modulates the phase or intensity of the light as shown in FIG. 1B. In this technique, the light may be modulated by utilizing electro-optical effects, acoustooptical effects, magnetooptical effects or nonlinear optical effects.

As described above, it is difficult to achieve ultrahigh speed light modulation by the method of directly modulating the output of a semiconductor laser diode. Thus, an external modulator is currently under vigorous research and development because an element of that type normally achieves high speed light modulation. Among various types of external modulators, an electro-optical modulator, which uses dielectric crystals exhibiting Pockel's effect, can operate at such an extremely high speed and yet causes little disturbance in phase as a result of the modulation. For that reason, this electro-optical modulator can be used very effectively in high-speed data transmission, long distance fiber-optics communications and other applications. Also, if an optical waveguide structure is constructed using such an electro-optical modulator, the modulator may be implemented at a small size and can operate efficiently enough at the same time.

An electro-optical modulator usually includes: a transmission line, which is provided as a modulating electrode (or signal electrode) on electro-optic crystals to propagate a modulating signal therethrough; and an optical waveguide, which is provided near the transmission line. In this electro-optical modulator, the refractive index of the optical waveguide is changed by an electric field to be induced around the modulating electrode, thereby modulating the phase of the light wave being propagated through the optical waveguide.

Crystals that are normally used in such an electro-optical modulator have a relatively small electro-optic coefficient. The electro-optic coefficient is a parameter that forms the basis of optical modulation. Accordingly, an electro-optical modulator should apply an electric field to the optical waveguide as efficiently as possible.

FIG. 2 is a cross-sectional view showing the fundamental structure of an electro-optical modulator. As shown in FIG. 2, an optical waveguide is provided on the surface of a substrate that is made up of crystals exhibiting electro-optical effects (i.e., electro-optic crystals), and a modulating electrode is provided on the optical waveguide.

The electro-optic crystals have optical anisotropy and change their refractive indices substantially proportionally to the strength of the electric field applied thereto (i.e., exhibit the Pockel's effect). Thus, by adjusting the potential V applied to the modulating electrode, the refractive index n of the optical waveguide can be changed. The variation $\Delta n$ in the refractive index of the optical waveguide is proportional to the strength of the electric field E applied to the optical waveguide. When the refractive index of the optical waveguide changes by $\Delta n$, the phase of the output light shifts by $\Delta \phi$ as shown in FIG. 2. The phase shift $\Delta \phi$ is normally proportional to the product of the strength of the electric field E and the length L of the optical waveguide.

To create the electric field in the optical waveguide, a modulating signal is supplied externally (i.e., from outside of the optical modulator) to the electrode of the optical modulator by way of the input line. Thus, it is important to input the modulating signal as efficiently as possible.

Next, a specific configuration for a conventional optical modulator will be described in further detail with reference to FIG. 3. FIG. 3 is a plan view of a conventional optical modulator as disclosed in U.S. Pat. No. 5,400,416.

As shown in FIG. 3, the optical modulator includes a substrate 101, which is made of an electro-optic material, and an optical waveguide 112, which may be formed on the surface of the substrate 101 by thermally diffusing a metal element toward a portion of the substrate 101, for example.

On the surface of the substrate 101, a parallel coupled line structure 113, obtained by patterning a metal film of aluminum, gold or other suitable metallic material, is provided on the right- and left-hand sides of the optical waveguide 112. On the other hand, a ground plane 114, also obtained by patterning a metal film, is provided on the back surface of the substrate 101. The parallel coupled line structure 113 includes two lines 113a and 113b that extend parallelly to each other.

In the example illustrated in FIG. 3, the two lines 113a and 113b of the parallel coupled line structure 113 are coupled together by way of a single line 124. However, the U.S. Pat. No. 5,400,416 identified above also discloses a structure in which the two lines 113a and 113b are not coupled together.

An input terminal 129 is further provided so as to be connected to a portion of the line 113b by way of a tap 128. An RF signal source 119 is connected between the input terminal 129 and the ground plane 114.

Incoming light is introduced through one end of the optical waveguide 112, passed through a portion of the optical waveguide 112 in the gap 116 between the two lines 113a and 113b of the parallel coupled line structure 113, and then output as outgoing light through the other end of the optical waveguide 112. In the meantime, the input terminal 129 and the parallel coupled line structure 113 are magnetically coupled together. Thus, an RF signal, supplied from the RF signal source 119, is propagated through the respective lines 113a and 113b of the parallel coupled line structure 113 to generate an electric field in the gap 116 between the lines 113a and 113b. According to the strength of that electric field, the refractive index of the optical waveguide 112 changes due to the electro-optical effects. As a result, the phase of the outgoing light is modulated. In this manner, the present optical modulator can operate as a phase modulator.

The parallel coupled line structure normally operates in either even mode or odd mode. In the odd mode, the voltages of the two lines included in the parallel coupled line structure have mutually opposite polarities, thus inducing a huge electric field in the gap between them. The optical modulator shown in FIG. 3 achieves light modulation highly efficiently by operating the two lines 113a and 113b of the parallel coupled line structure 113 in the odd mode responsive to the modulating signal.

However, to use such an optical modulator much more extensively in an optical communications system, for example, the performance of the optical modulator is not yet fully satisfactory but is still to be improved in many respects. That is to say, the development of an even more efficient optical modulator is awaited.

SUMMARY OF THE INVENTION

In order to overcome the problems described above, preferred embodiments of the present invention provide a highly efficient optical modulator for use effectively in an optical communications system, for example.

An optical modulator according to a preferred embodiment of the present invention preferably includes an optical waveguide, a modulating electrode, a conductive layer, an electric signal input section, and connector members. At least a portion of the optical waveguide is preferably made of an electro-optic material. The modulating electrode preferably includes a first conductor line and a second conductor line, which are coupled together electromagnetically, and preferably applies a modulating electric field to a portion of the optical waveguide. The conductive layer preferably forms a first microstrip line with the first conductor line and a second microstrip line with the second conductor line, respectively. Through the electric signal input section, an RF modulating signal is preferably supplied to the modulating electrode. The connector members preferably connect the first and second conductor lines together at both ends thereof. In this optical modulator, the first and second conductor lines preferably function as an odd-mode resonator for the RF modulating signal.

In one preferred embodiment of the present invention, the optical waveguide preferably includes: at least two optical waveguide branches; an optical input portion, which combines the two branches together; and an optical output portion, which also combines the two branches together. The portion of the optical waveguide, to which the modulating electric field is applied, is preferably divided into the two optical waveguide branches. The modulating electrode is preferably provided so as to apply electric fields with mutually opposite polarities to the two optical waveguide branches, respectively, and preferably functions as an intensity modulator for modulating the intensity of light that has been input to the optical waveguide.

In an alternative preferred embodiment, the modulating electrode may be provided so as to modulate the refractive index of the portion of the optical waveguide, to which the modulating electric field is applied, and may function as a phase modulator for modulating the phase of light that has been input to the optical waveguide.

In another preferred embodiment, the optical waveguide preferably includes at least two portions exhibiting remnant polarizations with mutually opposite polarities.

In still another preferred embodiment, the optical waveguide is preferably provided in a substrate that is made of the electro-optic material.

In yet another preferred embodiment, the electric signal input section preferably includes an input line, which forms another microstrip line with the conductive layer, and the input line is preferably connected to one of the first and second conductor lines.

In yet another preferred embodiment, the electric signal input section preferably includes: a coaxial connector, which is connected to a line that propagates the RF modulating signal therethrough; and an interconnecting member, which electrically connects the coaxial connector and the modulating electrode together.

An optical modulator according to another preferred embodiment of the present invention preferably includes an optical waveguide, a modulating electrode, a conductive layer and an electric signal input section. At least a portion of the optical waveguide is preferably made of an electro-optic material. The modulating electrode preferably includes a first conductor line and a second conductor line, which are coupled together electromagnetically, and preferably applies a modulating electric field to a portion of the optical waveguide. The conductive layer preferably forms a first microstrip line with the first conductor line and a second microstrip line with the second conductor line, respectively. Through the electric signal input section, an RF modulating signal is preferably supplied to the modulating electrode. In this optical modulator, the optical waveguide preferably includes at least two portions exhibiting remnant polarizations with mutually opposite polarities, and the first and second conductor lines preferably function as an odd-mode resonator for the RF modulating signal.

In one preferred embodiment of the present invention, the optical waveguide preferably includes: at least two optical waveguide branches; an optical input portion, which combines the two branches together; and an optical output portion, which also combines the two branches together. The portion of the optical waveguide, to which the modulating electric field is applied, is preferably divided into the two optical waveguide branches. The first and second conductor lines are preferably provided so as to apply electric fields with mutually opposite polarities to the two optical waveguide branches, respectively, and preferably function as an intensity modulator for modulating the intensity of light that has been input to the optical waveguide.

In an alternative preferred embodiment, the modulating electrode may be provided so as to modulate the refractive index of the portion of the optical waveguide, to which the modulating electric field is applied, and may function as a phase modulator for modulating the phase of light that has been input to the optical waveguide.

In another preferred embodiment, the optical modulator preferably further includes a connector member, which connects the first and second conductor lines together on at least one end thereof.

In still another preferred embodiment, the optical waveguide is preferably provided in a substrate that is made of the electro-optic material.

In yet another preferred embodiment, the electric signal input section preferably includes an input line, which forms another microstrip line with the conductive layer, and the input line is preferably connected to one of the first and second conductor lines.

In yet another preferred embodiment, the electric signal input section preferably includes: a coaxial connector, which is connected to a line that propagates the RF modulating signal therethrough; and an interconnecting member, which electrically connects the coaxial connector and the modulating electrode together.

An optical modulator according to still another preferred embodiment of the present invention preferably includes an optical waveguide, a modulating electrode, a conductive layer and an electric signal input section. At least a portion of the optical waveguide is preferably made of an electro-optic material. The modulating electrode preferably includes a first conductor line, a second conductor line and a third conductor line, which are coupled together electromagnetically, and preferably applies a modulating electric field to a portion of the optical waveguide. The conductive layer preferably forms a first microstrip line with the first conductor line, a second microstrip line with the second conductor line, and a third microstrip line with the third conductor line, respectively. Through the electric signal input section, an RF modulating signal is preferably supplied to the modulating electrode.

In one preferred embodiment of the present invention, the optical waveguide preferably includes: at least two optical waveguide branches; an optical input portion, which combines the two branches together; and an optical output portion, which also combines the two branches together. The portion of the optical waveguide, to which the modulating electric field is applied, is preferably divided into the two optical waveguide branches. The first and second conductor lines are preferably arranged so as to apply electric fields with mutually opposite polarities to one of the two optical waveguide branches. The second and third conductor lines are preferably arranged so as to apply electric fields with mutually opposite polarities to the other optical waveguide branch. The modulating electrode preferably functions as an intensity modulator for modulating the intensity of light that has been input to the optical waveguide.

In an alternative preferred embodiment, the modulating electrode may be provided so as to modulate the refractive index of the portion of the optical waveguide, to which the modulating electric field is applied, and may function as a phase modulator for modulating the phase of light that has been input to the optical waveguide.

In another preferred embodiment, the optical modulator preferably further includes a connector member, which connects the first, second and third conductor lines together on at least one end thereof.

In still another preferred embodiment, the optical waveguide preferably includes at least two portions exhibiting remnant polarizations with mutually opposite polarities.

In yet another preferred embodiment, the optical waveguide is preferably provided in a substrate that is made of the electro-optic material.

In yet another preferred embodiment, the electric signal input section preferably includes an input line, which forms another microstrip line with the conductive layer, and the input line is preferably connected to one of the first and third conductor lines.

In yet another preferred embodiment, the electric signal input section preferably includes: a coaxial connector, which is connected to a line that propagates the RF modulating signal therethrough; and an interconnecting member, which electrically connects the coaxial connector and the modulating electrode together.

A communications system according to yet another preferred embodiment of the present invention preferably includes the optical modulator according to any of the preferred embodiments of the present invention described above, an input section for inputting light to the optical modulator, and a control section for supplying the RF modulating signal to the optical modulator.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 5A schematically shows the distribution of electric field (as indicated by the solid arrows) and the distribution of magnetic field (as indicated by dashed arrows) on the cross section shown in FIG. 4B while the parallel coupled line structure operates in the even mode.

FIG. 5B schematically shows the distribution of electric field (as indicated by the solid arrows) and the distribution of magnetic field (as indicated by dashed arrows) on the cross section shown in FIG. 4B while the parallel coupled line structure operates in the odd mode.

FIG. 6 is a plan view showing the planar sizes of a parallel coupled line structure and an input line, which were used in the electromagnetic simulation for the optical modulator of the first preferred embodiment, and the position at which the input line was connected to the parallel coupled line structure.

FIG. 17A is a plan view showing a layout for an optical modulator according to a fourth specific preferred embodiment of the present invention.

FIG. 17B is a cross-sectional view of the optical modulator as viewed on the plane XVIIb—XVIIb shown in FIG. 17A.

FIG. 17C is a perspective view showing how a coaxial connector core conductor 210 and an interconnecting member 211 may be connected together.

DETAILED DESCRIPTION OF PREFERRED EMBODIMENTS

Embodiment 1

Figure 4A:
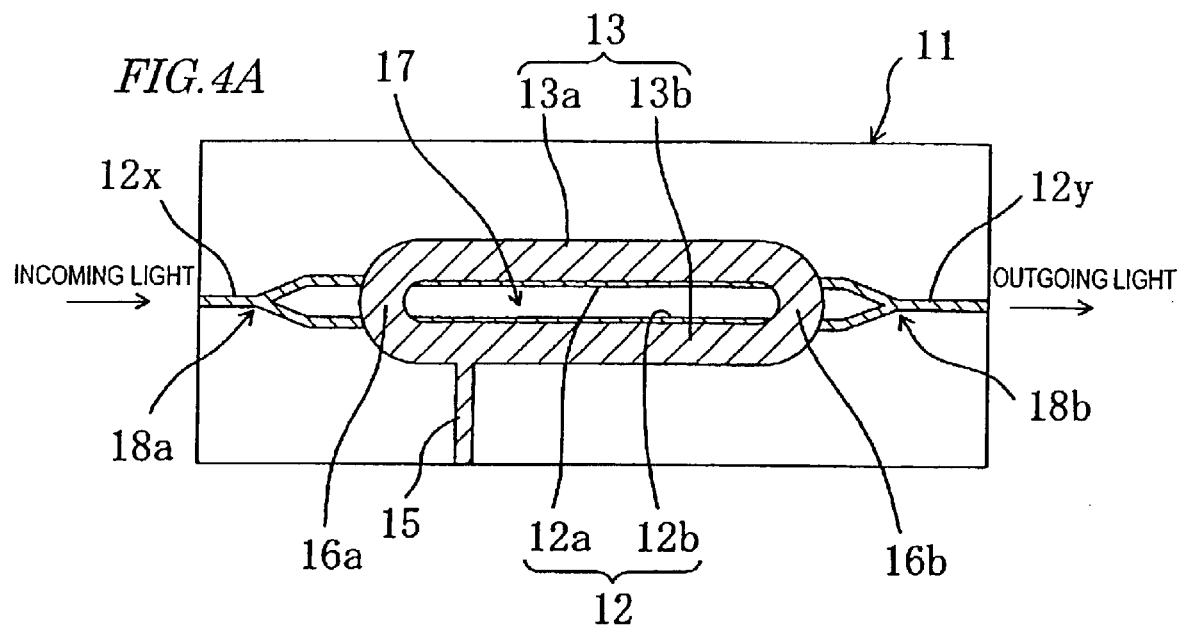
FIG. 4A is a plan view showing a layout for an optical modulator according to a first specific preferred embodiment of the present invention.
Figure 4B:
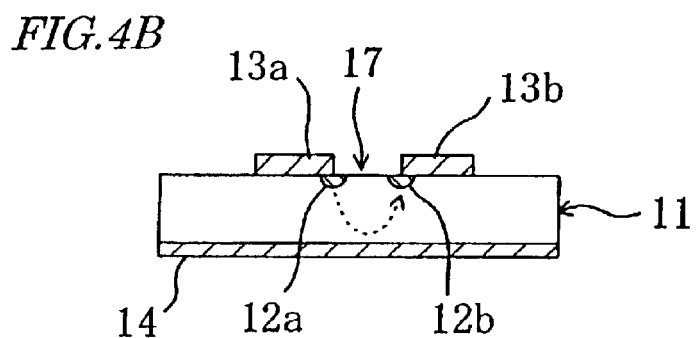
FIG. 4B is a cross-sectional view of the optical modulator shown in FIG. 4A as viewed on a plane that crosses the waveguide thereof at right angles.
Figure 4C:
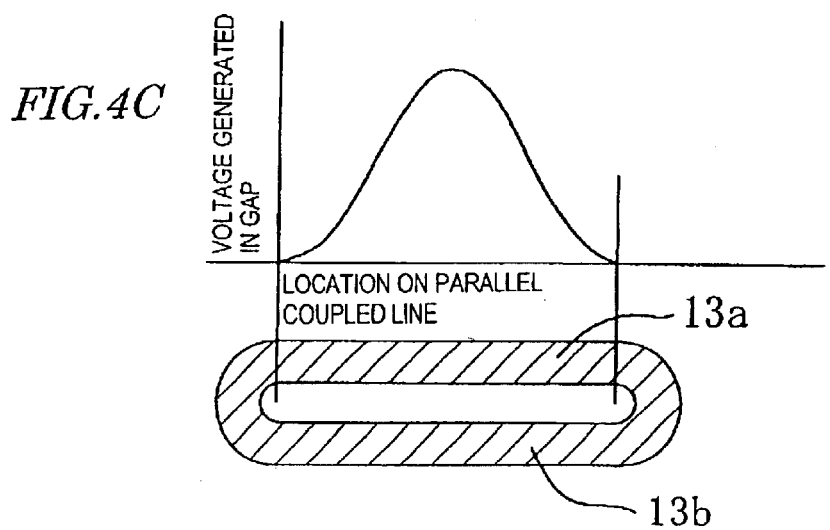
FIG. 4C schematically shows a field strength distribution formed by the modulating electrode of the optical modulator shown in FIG. 4A.

Hereinafter, an optical modulator according to a first specific preferred embodiment of the present invention will be described with reference to FIGS. 4A through 4C. FIG. 4A illustrates a planar layout for the optical modulator of this preferred embodiment. FIG. 4B illustrates a cross section thereof as viewed on a plane that crosses the waveguide thereof at right angles. FIG. 4C schematically shows a field strength distribution formed by the modulating electrode of the optical modulator shown in FIG. 4A.

As shown in FIG. 4A, the optical modulator of this preferred embodiment includes an optical waveguide 12, which may be formed in the surface region of a substrate 11 by a proton exchange process using benzoic acid, for example. The substrate 11 is preferably made of an electro-optic material such as lithium tantalate ($LiTaO_3$) single crystals or lithium niobate ($LiNbO_3$) single crystals.

The optical waveguide 12 is divided into two optical waveguide branches 12a and 12b at two branching points 18a and 18b. In this optical waveguide 12, incoming light is input through an optical input portion 12x thereof and then split into two light beams at the former branching point 18a. Next, the two light beams are passed through the two optical waveguide branches 12a and 12b, respectively, and then combined together at the latter branching point 18b. Thereafter, the combined light travels through the common optical output portion 12y toward the outlet port. An optical waveguide 12 having such a configuration is called a "Mach-Zehnder interferometer type optical waveguide".

A parallel coupled line structure 13, including two lines 13a and 13b that extend along the optical waveguide branches 12a and 12b of the optical waveguide 12, is provided on the substrate 11. As shown in FIG. 4B, these two lines 13a and 13b are arranged such that each of these lines 13a and 13b has its inner edge positioned right over the centerline of its associated optical waveguide branch 12a or 12b. These two lines 13a and 13b are connected together at both ends thereof by way of connector lines 16a and 16b.

An input line (i.e., feeder line) 15 is further provided on the substrate 11 and connected to one line 13b of the parallel coupled line structure 13. An electric signal (i.e., an RF signal) is supplied through this input line 15 for modulating purposes.

The two lines 13a and 13b of the parallel coupled line structure 13, the connector lines 16a and 16b and the input line 15 are preferably obtained by depositing a film of aluminum, gold or any other suitable metal by an evaporation process and then patterning the film by photolithographic and etching techniques, for example. A ground plane (i.e., a grounded conductive layer) 14 is preferably formed by a similar process on the back surface of the substrate 11.

Although not shown in FIG. 4B, an electrically insulating buffer layer of $SiO_2$, for example, is preferably provided between the lines 13a and 13b and the substrate 11.

In the optical modulator of this preferred embodiment, the modulating electrode is made up of the lines 13a and 13b and connector lines 16a and 16b that are coupled together electromagnetically. A first microstrip line is formed by the line 13a and the ground plane 14 and a second microstrip line is formed by the line 13b and the ground plane 14. An electric signal that has been input to this optical modulator for modulation purposes is propagated through these microstrip lines.

The light to be modulated (e.g., a laser beam) is input through the optical input portion 12x of the optical waveguide 12 and then modulated in the following manner while passing through the respective optical waveguide branches 12a and 12b.

In this preferred embodiment, the electric signal (i.e., the RF signal) for optical modulation is supplied to the respective lines 13a and 13b of the parallel coupled line structure 13 by way of the input line 15. In this case, the wavelength of the RF signal being propagated through the parallel coupled line structure 13 by way of the input line 15 may be determined by its frequency and the dielectric constant of the substrate, for example. In this preferred embodiment, various design parameters, including the length and width of the respective lines 13a and 13b, are defined appropriately according to the wavelength of the RF signal. Accordingly, the input of a predetermined RF signal to the input line 15 causes resonance in the parallel coupled line structure 13.

Once that resonance has been set up, an electric field is created in the gap 17 of the parallel coupled line structure 13 as pointed by the dashed arrow in FIG. 4B. In this case, signal power is accumulated in the resonator, and therefore, the electric field has an extremely high strength. This electric field oscillates at the resonance frequency to change its directions and strengths periodically. And when such an oscillating field is present on or around the optical waveguide, the refractive index of the material of the optical waveguide branches 12a and 12b changes periodically with the electric field strength due to electro-optical effects.

In this preferred embodiment, a downward electric field is applied to the optical waveguide branch 12a but an upward electric field is applied to the optical waveguide branch 12b as shown in FIG. 4B. That is to say, electric fields are applied to these branches 12a and 12b in mutually opposite directions. Accordingly, if the substrate 11 is made of z-cut lithium tantalate crystals, for example, the phase shift produced in the light being transmitted through one optical waveguide branch 12a will be reverse to that produced in the light being transmitted through the other optical waveguide branch 12b. As a result, at the optical output portion 12y of the optical waveguide 12, the light beams that have been transmitted through the two optical waveguide branches 12a and 12b interfere with each other. This interference changes the intensity of the outgoing light eventually. In this manner, the optical modulator of this preferred embodiment operates as a light intensity modulator.

Hereinafter, the resonance mode of the parallel coupled line structure 13 will be described.

In this preferred embodiment, the two lines 13a and 13b of the parallel coupled line structure 13 are mutually independent parallel transmission lines and are arranged so as to be coupled together electromagnetically. One transmission line (i.e., a microstrip line) is formed by one 13a of the two lines and the ground plane 14, and another transmission line (i.e., a microstrip line) is formed by the other line 13b and the ground plane 14. These two transmission lines are closely arranged so as to be parallel to each other, and are coupled together electromagnetically to define the parallel coupled line structure 13.

However, the transmission lines do not have to be arranged as shown in FIGS. 4A and 4B, but may have any other arrangement as long as each of the transmission lines includes a pair of two parallel conductors supporting oppositely directed currents and can propagate an electromagnetic wave therethrough. In that case, one of the forward and backward paths (i.e., the line 13a or 13b in this preferred embodiment) may be a normal line electrode (which is called a "strip electrode" or "hot electrode"), while the other path may be a ground electrode (i.e., the ground plane 14 in this preferred embodiment).

The parallel coupled line structure 13 is formed by coupling together the two transmission lines each of which can operate as a microstrip line. Thus, the resonance modes of the parallel coupled line structure 13 include two independent propagation modes, i.e., even mode and odd mode.

FIG. 5A schematically shows the distribution of electric field (as indicated by the solid arrows) and the distribution of magnetic field (as indicated by dashed arrows) on the cross section shown in FIG. 4B while the parallel coupled line structure 13 operates in the even mode. FIG. 5B schematically shows the distribution of electric field (as indicated by the solid arrows) and the distribution of magnetic field (as indicated by dashed arrows) on the cross section shown in FIG. 4B while the parallel coupled line structure 13 operates in the odd mode. In the even mode (i.e., common mode), the voltage applied to one of the two line electrodes is equal to the voltage applied to the other line electrode as shown in FIG. 5A. In the even mode, an electric field is formed between each of the two line electrodes and the ground electrode but almost no electric field is formed in the gap between the lines (i.e., the gap 17 shown in FIG. 4B).

In the odd mode (or the opposite phase mode) on the other hand, the voltage applied to one of the two coupled parallel lines and the voltage applied to the other line have mutually opposite polarities as shown in FIG. 5B. In the odd mode, electric fields are formed not only between each line and the ground electrode but also in the gap between the lines (i.e., in the gap 17 shown in FIG. 4B). If the two coupled lines are arranged sufficiently closely to each other, then a huge electric field is formed in the gap between those two lines.

In this preferred embodiment, the length and width of the two lines 13a and 13b of the parallel coupled line structure 13 and the connecting point between the input line 15 and the line 13b are adjusted such that the odd-mode resonance is produced in those two lines 13a and 13b. More specifically, the length of the lines 13a and 13b is defined to be approximately half of the wavelength of the RF modulating signal. Also, as will be described later, the connecting point of the input line 15 to the line 13b is defined at an appropriate position to minimize the unwanted reflection of the signal being propagated in the odd mode. Thus, the ½ wave odd-mode resonance is produced in the parallel coupled line structure 13, thereby inducing a huge electric field in the gap 17 between the two lines 13a and 13b. As a result, the light can be modulated very efficiently.

In this preferred embodiment, the two lines 13a and 13b of the parallel coupled line structure 13 are connected together at both ends thereof by way of the connector lines 16a and 16b. Accordingly, the voltage to be generated between the lines 13a and 13b is distributed as a trigonometric function such as that shown in FIG. 4C, in which the voltage is zero at both ends of the lines 13a and 13b but reaches its peak value at the midpoint of the lines 13a and 13b. The electric field formed between the lines 13a and 13b has the same direction everywhere. Thus, while the incoming light is passing through the optical waveguide branch 12a or 12b under one of the two lines 13a and 13b, the phase shifts thereof never cancel each other but are continuously added together along the full length of the line 13a or 13b (i.e., half of the wavelength of the RF signal). As a result, high modulation efficiency is achieved.

To operate the optical modulator of this preferred embodiment appropriately, the odd-mode resonance needs to be caused efficiently in the parallel coupled line structure 13 by the modulating signal. In this preferred embodiment, the input line 15 is connected at a position where input impedances can be well matched with each other. Thus, the odd-mode resonance is achieved easily.

The present inventors analyzed the characteristics of the optical modulator of this preferred embodiment and an optical modulator having a conventional structure (as a comparative example) by an electromagnetic field simulation. The results will be described below.

Figure 7:
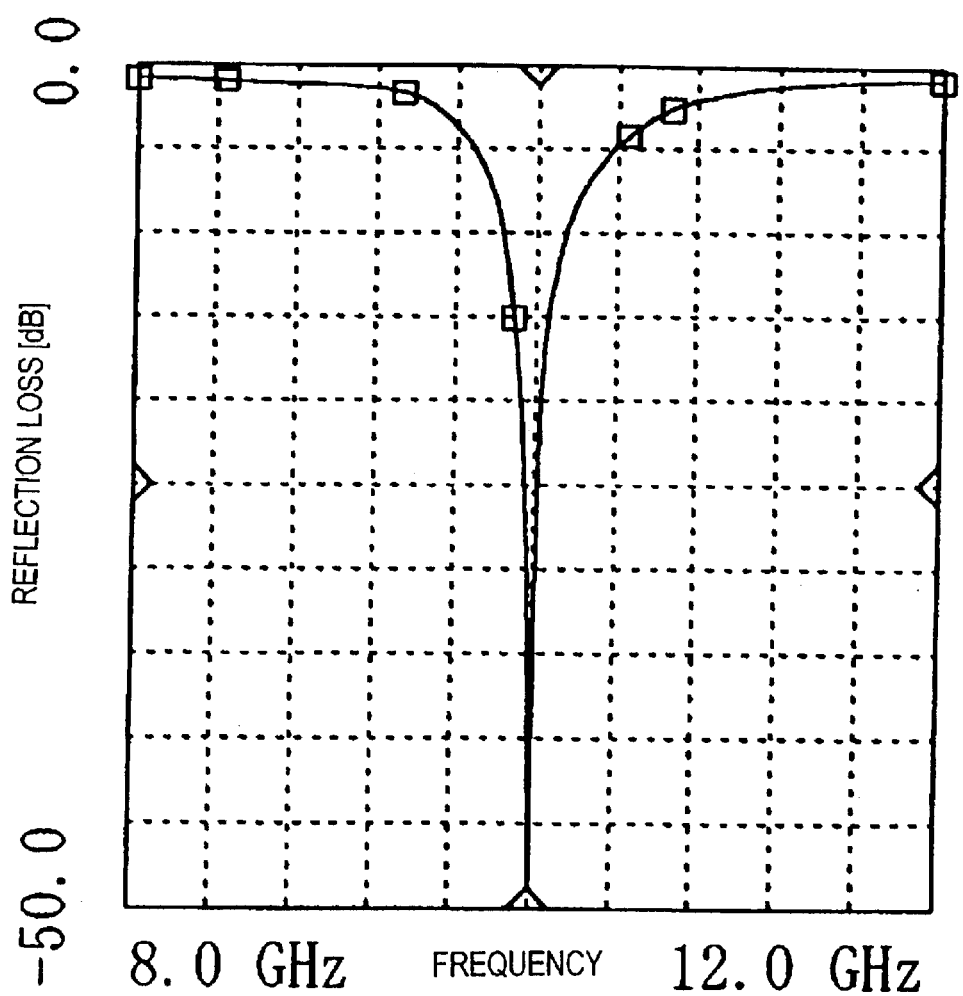
FIG. 7 is a graph showing the reflection loss characteristic of the optical modulator of the first preferred embodiment in the resonance state based on the results of the electromagnetic simulations.

FIG. 6 is a plan view showing the planar sizes of a parallel coupled line structure and an input line, which were used in the electromagnetic simulation, and the position at which the input line was connected to the parallel coupled line structure. FIG. 7 is a graph showing the reflection loss characteristic of the optical modulator in the resonance state based on the results of the electromagnetic simulations.

In this analysis, the substrate 11 was made up of z-cut lithium tantalate crystals (with a dielectric constant of 41 and) with a thickness of about 0.4 mm, the two lines 13a and 13b of the parallel coupled line structure 13 each had a width of about 0.05 mm, the gap 17 between the lines 13a and 13b had a width of about 0.02 mm, and the input line 15 had a width of about 0.05 mm so as to have a characteristic impedance of about 50 Ω. The respective lines 13a, 13b, 16a, 16b and 15 were made of gold and had a thickness of about 2 μm. The length of the two lines 13a and 13b of the parallel coupled line structure 13 and the connecting point at which the input line 15 was connected to the line 13b were determined with an electromagnetic field simulator such that the odd-mode resonance was set up at a frequency of about 10 GHz and that the reflection of the signal that had been input to the input line 15 was minimized at that frequency (i.e., such that the input impedances were matched with each other).

As a result, the two lines 13a and 13b of the parallel coupled line structure 13 each had a length of about 3 mm and the input line 15 was connected to a point that was about 0.69 mm away from the centerline of the parallel coupled line structure 13 as shown in FIG. 6. In this case, the input signal was not reflected anymore from the resonance point but almost all of the signal power was input to the resonator as can be seen from FIG. 6. According to the results of conformal mapping calculations, the optical modulation efficiency to be achieved in this particular embodiment would bring about a phase shift of π degrees in the light wave being propagated through the two optical waveguide branches. In other words, the power to be supplied to increase the optical output power from 0 to its peak value turned out to be approximately 0.43 W, which is much lower than that of the conventional optical modulator. Thus, according to this preferred embodiment, high modulation efficiency is achieved.

Figure 8A:
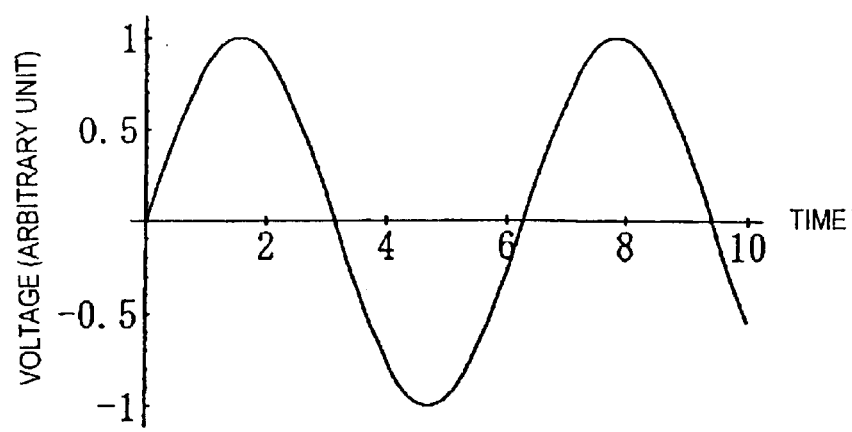
FIG. 8A is a graph showing the waveform of the RF signal to be input to the parallel coupled line structure 13 in the optical modulator of the first preferred embodiment.
Figure 8B:
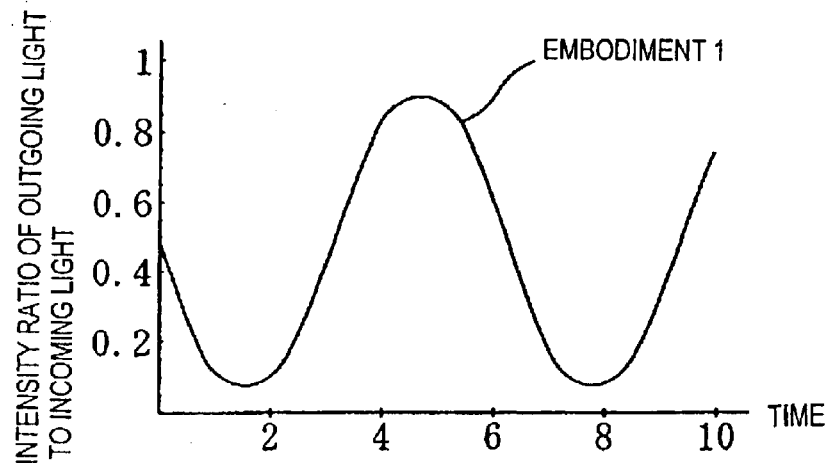
FIG. 8B is a graph showing the intensity ratio of the outgoing light to the incoming light in the optical modulator of the first preferred embodiment.
Figure 8C:
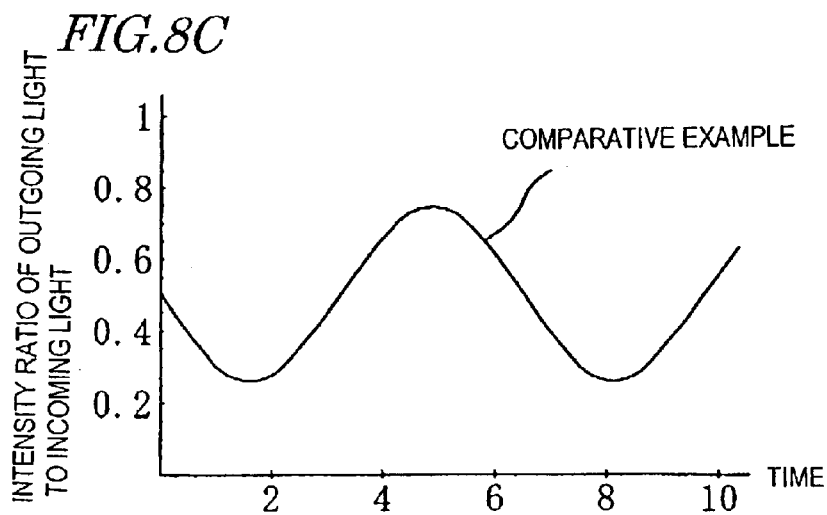
FIG. 8C is a graph showing the intensity ratio of the outgoing light to the incoming light in the optical modulator of the comparative example.

FIG. 8A shows the waveform of the RF signal to be input to the parallel coupled line structure 13. FIG. 8B shows the intensity ratio of the outgoing light to the incoming light in the optical modulator of this preferred embodiment, while FIG. 8C shows the intensity ratio of the outgoing light to the incoming light in the optical modulator of the comparative example. In the graph shown in FIG. 8A, the ordinate represents the voltage of the RF signal and the abscissa represents the time. In the graphs shown in FIGS. 8B and 8C, the ordinate represents the intensity ratio of the outgoing light to the incoming light and the abscissa represents the time. The intensity ratio of the outgoing light to the incoming light was calculated without taking the loss caused on the optical waveguide into account.

The simulations were carried out with a π/2 phase bias applied between the two optical waveguide branches. In the optical modulator of the comparative example for use in this analysis (see FIG. 3), the resonance frequency (of 10 GHz) and the width and thickness of the lines 113a and 113b were the same as the lines 13a and 13b of the optical modulator of this preferred embodiment, and the optical waveguide 112 was also divided into two branches as in the optical modulator of this preferred embodiment. On the other hand, the length (of 1.5 mm) of those lines 113a and 113b and the connecting point at which the input line 129 was connected to the line 113b were determined with the electromagnetic field simulator such that the odd-mode resonance was produced at 10 GHz and that the input impedances were substantially matched with each other.

Comparing the graphs shown in FIGS. 8B and 8C with each other, it can be seen that the optical modulation efficiency of the optical modulator of this preferred embodiment was much higher than that of the conventional optical modulator. The reasons why the optical modulation efficiency is improved by this preferred embodiment are believed to be as follows.

Firstly, the two lines 13a and 13b of the parallel coupled line structure 13 are connected together at both ends thereof by way of the connector lines 16a and 16b. Thus, the parallel coupled line structure 13 can function as a ½ wave resonator as shown in FIG. 4C. In contrast, the parallel coupled line structure 113 of the conventional optical modulator shown in FIG. 3 achieves just ¼ wave resonance.

Thus, in the optical modulator of this preferred embodiment, when the odd-mode resonance is produced, the two connector lines 16a and 16b may function as nodes for the resonance. However, in the conventional optical modulator shown in FIG. 3, when odd-mode impedance matching is realized, the open ends of the parallel coupled line structure 113 function as antinodes for the resonance, not as nodes. The optical modulator of this preferred embodiment can produce a ½ wave odd-mode resonance. Thus, the light being propagated through a portion of the optical waveguide branch 12a or 12b, having a length corresponding to half of the wavelength of the RF modulating signal, can be modulated, thus increasing the optical modulation efficiency compared to the conventional optical modulator shown in FIG. 3.

Hereinafter, specific examples of a preferred embodiment of the present invention will be described with reference to FIGS. 9A and 9B. The optical modulator shown in FIG. 9A has an electrode structure that produces resonance at 10 GHz, while the optical modulator shown in FIG. 9B has an electrode structure that produces resonance at 26 GHz.

Figure 9A:
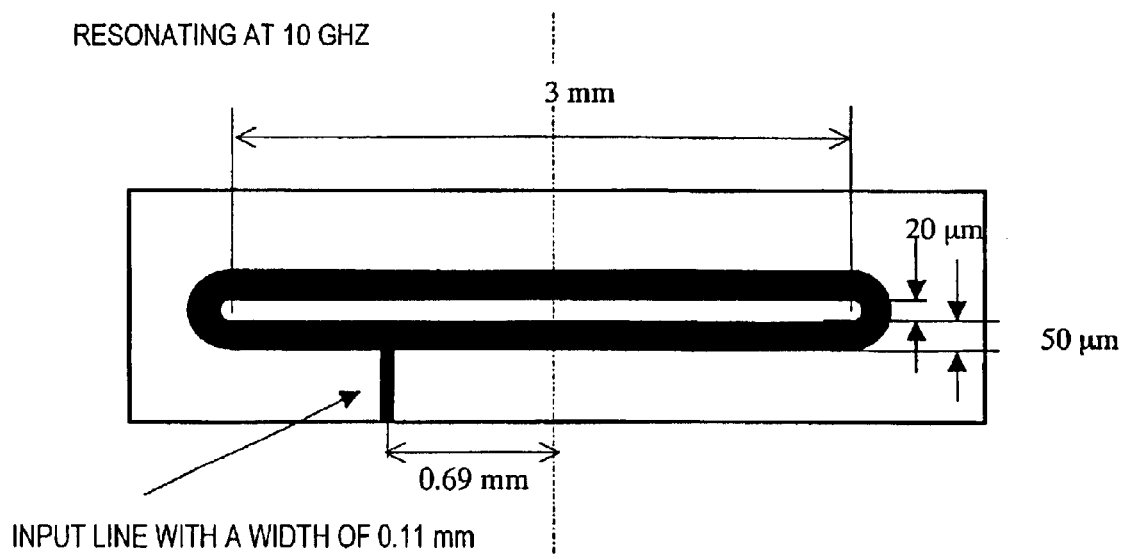
FIG. 9A is a plan view showing an optical modulator, including an electrode structure that produces resonance at 10 GHz, as a specific example of the first preferred embodiment.
Figure 9B:
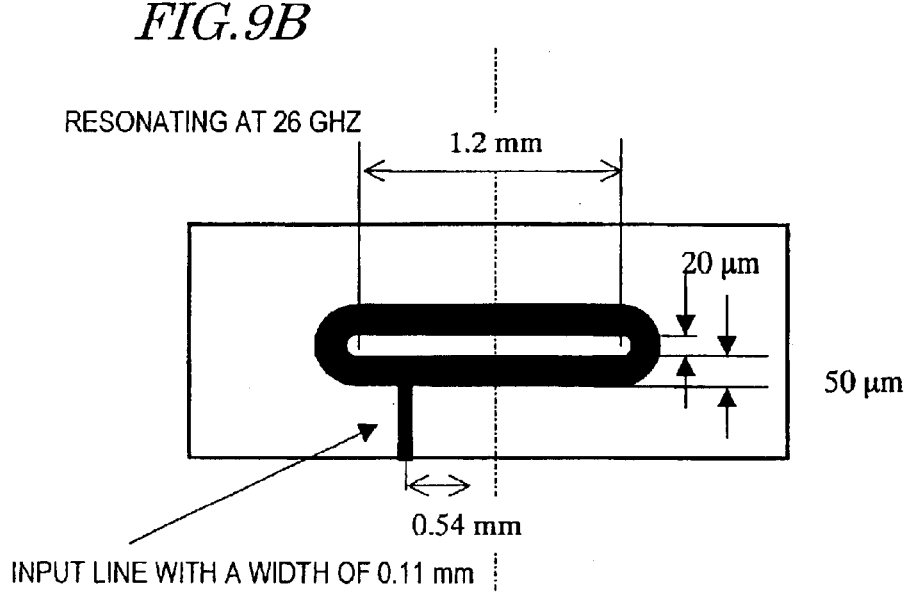
FIG. 9B is a plan view showing an optical modulator, including an electrode structure that produces resonance at 26 GHz, as another specific example of the first preferred embodiment.

The modulating electrodes of these two optical modulators were laid out and sized as shown in FIGS. 9A and 9B, respectively. Specifically, the substrate thereof was made of z-cut LiTaO₃ crystals (with a thickness of about 0.4 mm). A Mach-Zehnder optical waveguide with a width of about 5 μm was formed on the surface of the substrate by a proton exchange process using benzoic acid.

The surface of the substrate, on which the optical waveguide had been formed, was coated with a buffer layer of SiO₂ having a thickness of about 0.13 μm. Then, an aluminum film was deposited to a thickness of about 0.9 μm on the buffer layer by an evaporation process. Thereafter, the aluminum film was patterned by photolithographic and etching techniques, thereby forming a parallel coupled line structure and an input line of aluminum simultaneously. The parallel coupled line structure had a width of about 50 μm, the gap between the lines had a width of about 20 μm and the input line had a width of 110 μm. It should be noted that the parallel coupled line structure and input line are not illustrated on their actual scales in the optical modulators shown in FIGS. 9A and 9B.

Figure 10:
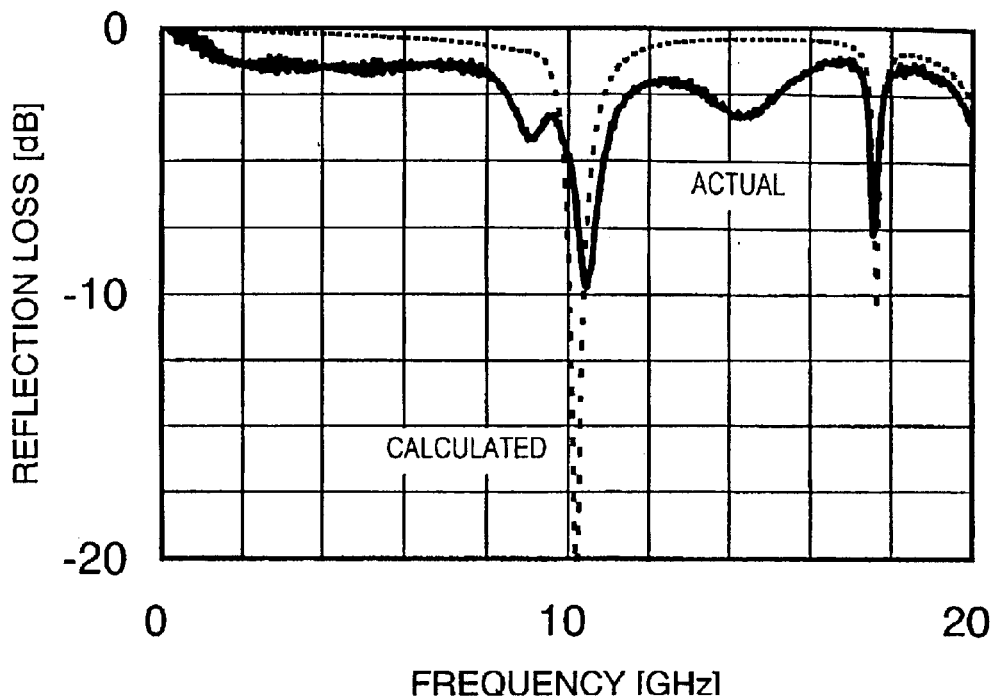
FIG. 10 is a graph showing the reflection loss characteristic of the optical modulator shown in FIG. 9A.

Incoming light with a wavelength of about 1.3 μm was modulated experimentally by these optical modulators. FIG. 10 is a graph showing the calculated and actually measured modulation characteristics of the optical modulators. In FIG. 10, the ordinate represents the reflection loss and the abscissa represents the frequency. Also, in FIG. 10, the actually collected data is represented by the solid curve while the data obtained by the electromagnetic field simulation is represented by the dotted curve.

The results shown in FIG. 10 revealed that the non-loaded Q value, which is an index indicating the degree of signal power accumulated in a resonator, was about 30. This means that the power that was accumulated in the resonator was approximately 30 times as large as the signal power that had been input to the resonator. Based on these results, the present inventors confirmed that extremely high optical modulation efficiency was achieved by using the modulating electrode of this preferred embodiment.

Figure 11:
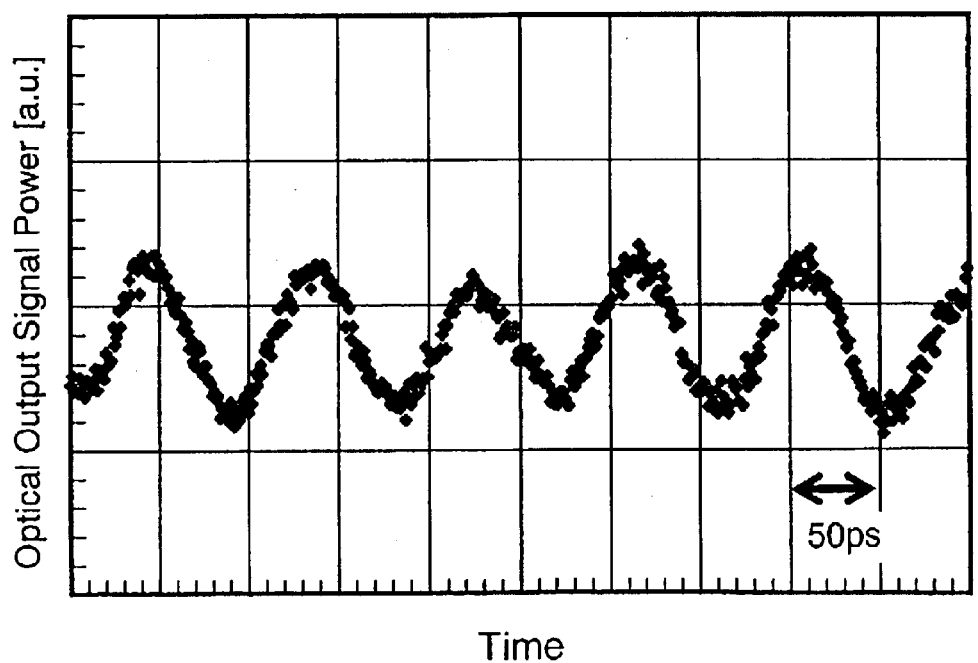
FIG. 11 is a graph showing how the optical output power of the optical modulator shown in FIG. 9A changed with time.

FIG. 11 is a graph showing how the optical output power of the optical modulators changed with time.

Figure 12:
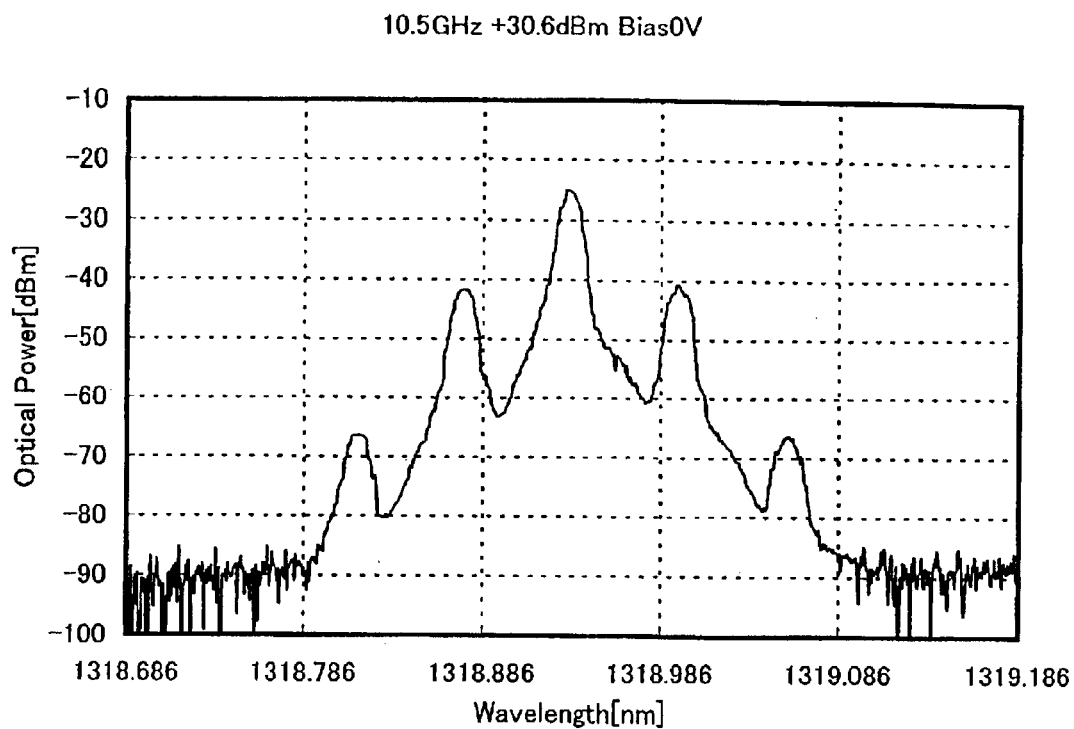
FIG. 12 is a graph showing the spectrum of the light that was modulated by the optical modulator shown in FIG. 9A.

As can be seen from FIGS. 10 and 11, an optical modulator, including a modulating electrode that produced resonance at as high a frequency as 10 GHz, could be obtained. When an RF signal with a power of about 100 mW was supplied to the optical modulator, the optical modulator resulted in a modulation index of about 0.2 rad. FIG. 12 shows the spectrum of the light that was modulated by such an optical modulator.

Figure 13:
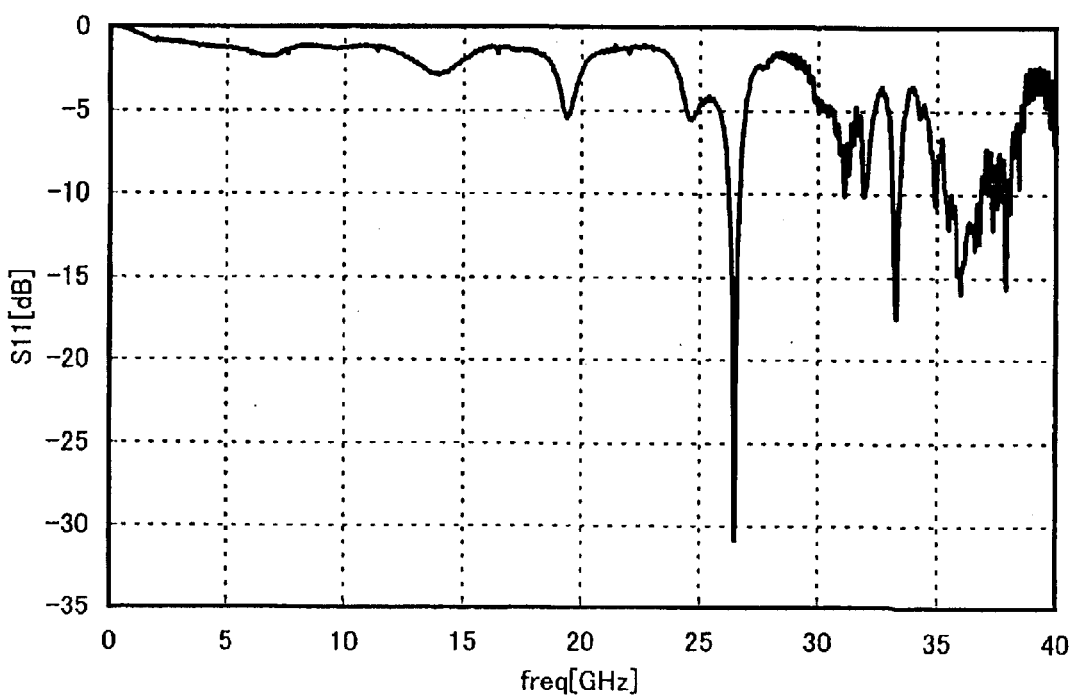
FIG. 13 is a graph showing the actually measured reflection characteristic of the modulating electrode in the optical modulator shown in FIG. 9B.

FIG. 13 is a graph showing the actually measured reflection characteristic of a modulating electrode that produced resonance at 26 GHz.

Figure 14:
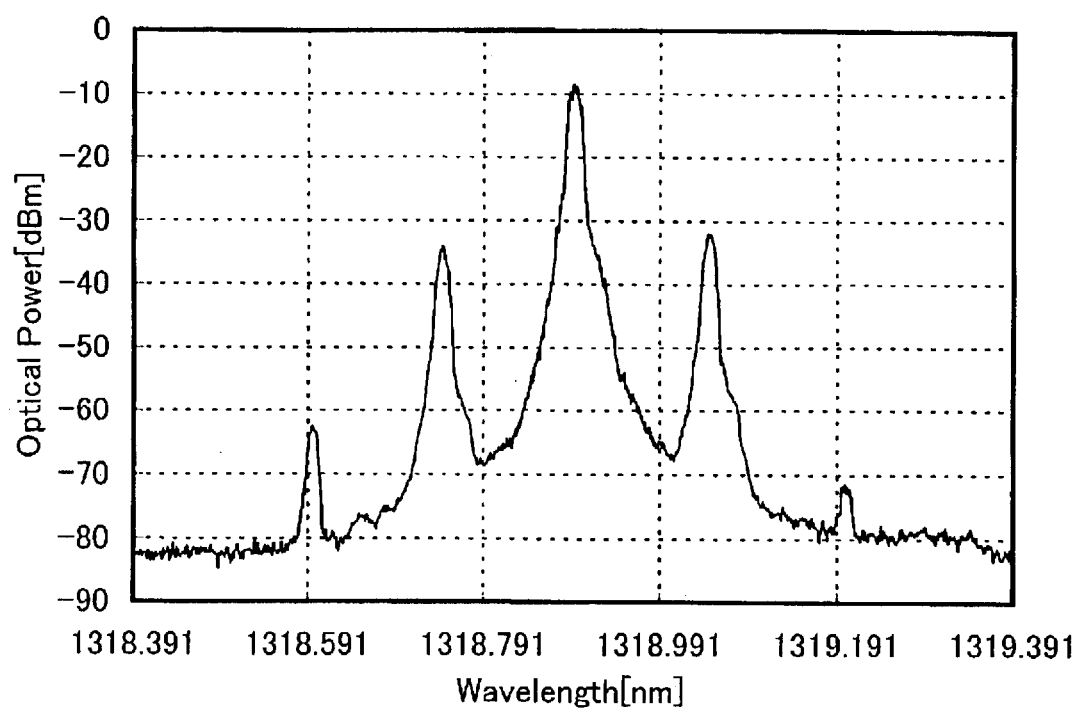
FIG. 14 is a graph showing the spectrum of the light that was modulated by the optical modulator shown in FIG. 9B.

The results shown in FIG. 13 revealed that the non-loaded Q value was about 60. Based on these results, the present inventors confirmed that extremely high optical modulation efficiency was achieved by using the modulating electrode of this preferred embodiment. FIG. 14 shows the spectrum of the light that was modulated by such an optical modulator.

Each of these optical modulators produced resonance in the odd mode. In a parallel coupled line structure, resonance may also be produced in the even mode. However, even when the same electrode structure is used, the resonance frequency or impedance may change depending on whether the resonance is produced in the odd mode or in the even mode. Thus, in this preferred embodiment, the length of the parallel coupled line structure, the width of the gap and the connecting point of the input line are adjusted such that only odd-mode resonance is produced responsive to an RF signal having a predetermined frequency.

Embodiment 2

Figure 15A:
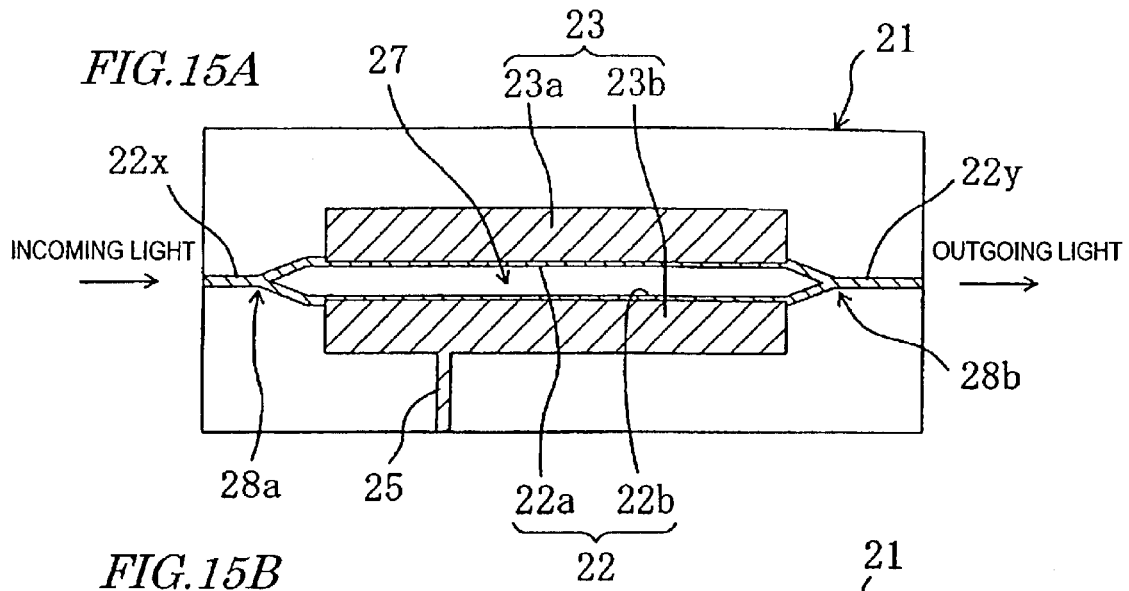
FIG. 15A is a plan view showing a layout for an optical modulator according to a second specific preferred embodiment of the present invention.
Figure 15B:
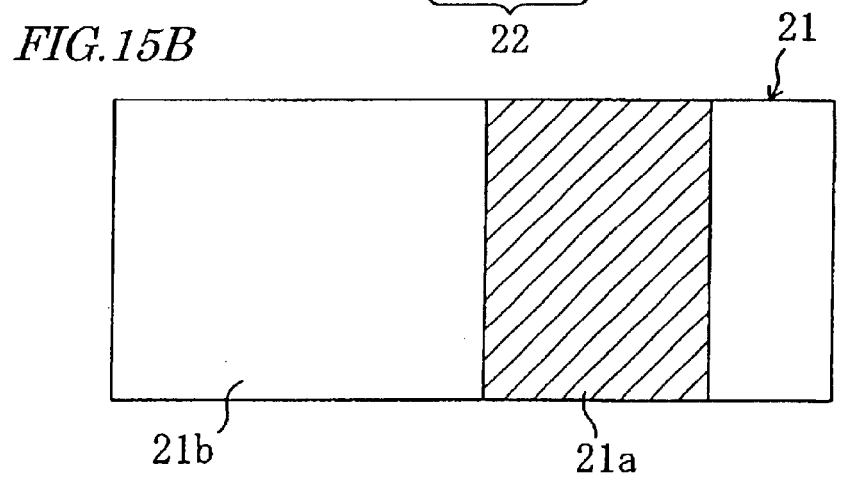
FIG. 15B is a plan view showing a substrate domain that exhibits a remnant polarization with a reversed polarity.
Figure 15C:
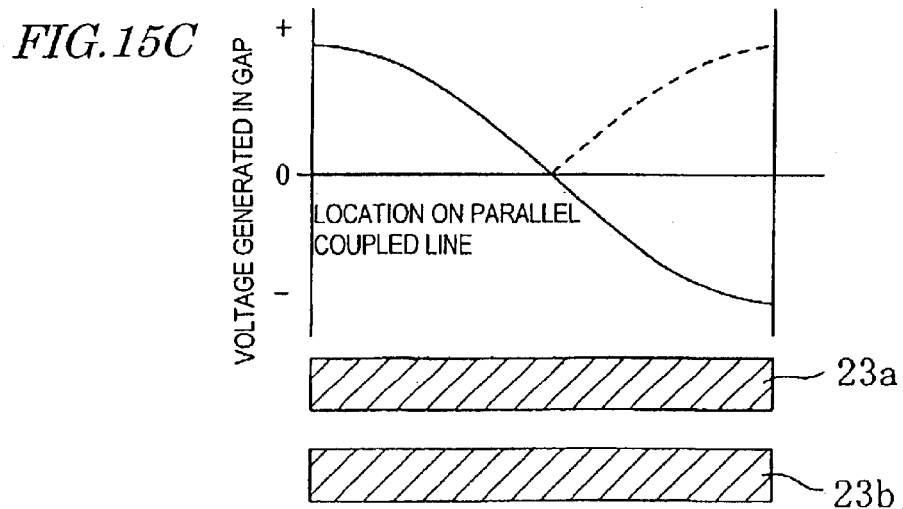
FIG. 15C is a graph showing the distribution of electric field strength in the parallel coupled line structure shown in FIG. 15A.

Hereinafter, an optical modulator according to a second specific preferred embodiment of the present invention will be described with reference to FIGS. 15A through 15C. FIG. 15A shows a planar layout for the optical modulator of this second preferred embodiment. FIG. 15B shows a domain of the substrate in which the polarity of remnant polarization is inverted. FIG. 15C shows the distribution of electric field strength on a parallel coupled line structure.

As shown in FIG. 15A, the optical modulator of this preferred embodiment includes an optical waveguide 22, which may be formed on the surface of a substrate 21 by a proton exchange process using benzoic acid, for example. The substrate 21 is preferably made of an electro-optic material such as lithium tantalate ($LiTaO_3$) single crystals or lithium niobate ($LiNbO_3$) single crystals.

The optical waveguide 22 is divided into two optical waveguide branches 22a and 22b at two branching points 28a and 28b. In this optical waveguide 22, incoming light is input through an optical input portion 22x thereof and then split into two light beams at the former branching point 28a. Next, the two light beams are passed through the two optical waveguide branches 22a and 22b, respectively, and then combined together at the latter branching point 28b. Thereafter, the combined light travels through the common optical output portion 22y toward the outlet port.

A parallel coupled line structure 23, including two lines 23a and 23b that extend along the optical waveguide branches 22a and 22b of the optical waveguide 22, is provided on the substrate 21. These two lines 23a and 23b are arranged such that each of these lines 23a and 23b has its inner edge positioned right over the centerline of its associated optical waveguide branch 22a or 22b. An input line 25 is further provided on the substrate 21 and connected to one line 23b of the parallel coupled line structure 23. An electric signal (i.e., an RF signal) is supplied through this input line 25 to produce resonance in the parallel coupled line structure 23. The two lines 23a and 23b of the parallel coupled line structure 23 and the input line 25 are preferably obtained by depositing a film of aluminum, gold or any other suitable metal by an evaporation process and then patterning the film by photolithographic and etching techniques, for example. A ground plane (i.e., a grounded conductive layer) 24 is preferably formed by a similar process on the back surface of the substrate 21. In these respects, the optical modulator of this second preferred embodiment is the same as the counterpart of the first preferred embodiment described above.

In this second preferred embodiment, however, both ends of the two lines 23a and 23b are not closed but opened unlike the first preferred embodiment described above. Also, the substrate 21 is divided into two domains 21a and 21b in which the remnant polarization has mutually opposite directions (i.e., which have electro-optic coefficients with mutually opposite polarities). That is to say, in this preferred embodiment, the substrate domain 21b that is located under the first half of the two lines 23a and 23b of the parallel coupled line structure 23 and the substrate domain 21a that is located under the second half of the two lines 23a and 23b of the parallel coupled line structure 23 exhibit remnant polarizations with mutually opposite polarities.

In this preferred embodiment, the substrate domain 21a, located under the second half of the two lines 23a and 23b, exhibits a remnant polarization having a first polarity (i.e., positive or negative), while the remaining substrate domain 21b, including a domain located under the first half of the two lines 23a and 23b, exhibits a remnant polarization having a second polarity (i.e., negative or positive). That is to say, the remnant polarization of the domain 21a is reverse to that of the domain 21b.

The incoming light, which has been introduced through the optical input portion 22x of the optical waveguide 22, is subjected to the following modulation while being propagated through the two optical waveguide branches 22a and 22b.

The input of an RF signal to the input line 25 causes resonance in the two lines 23a and 23b of the parallel coupled line structure 23. Once that resonance has been set up, an electric field is created in the gap 27 of the parallel coupled line structure 23 as pointed by the dashed arrow in FIG. 4B. Then, the refractive index of the material of the optical waveguide branches 22a and 22b changes with the electric field strength due to electro-optical effects. In this preferred embodiment, a downward electric field is applied to the optical waveguide branch 22a but an upward electric field is applied to the optical waveguide branch 22b as in the first preferred embodiment described above. That is to say, electric fields are applied to these branches 22a and 22b in mutually opposite directions. Accordingly, if the substrate 21 is made of z-cut lithium tantalate crystals, for example, the phase shift produced in the light being transmitted through one optical waveguide branch 22a will be reverse to that produced in the light being transmitted through the other optical waveguide branch 22b. As a result, at the optical output portion 22y of the optical waveguide 22, the light beams that have been transmitted through the two optical waveguide branches 22a and 22b interfere with each other. This interference changes the intensity of the outgoing light eventually. In this manner, the optical modulator of this preferred embodiment operates as a light intensity modulator.

In this preferred embodiment, both ends of the parallel coupled line structure 23 are opened. Accordingly, the voltage to be generated between the lines 23a and 23b is distributed as a trigonometric function such as that shown in FIG. 15C, in which the voltage is zero at the midpoint of the lines 23a and 23b and reaches its peaks with the opposite signs at both ends thereof. Thus, the direction of the electric field formed between the first halves of the lines 23a and 23b is opposite to that of the electric field formed between the second halves of the lines 23a and 23b. Suppose the overall substrate 21 exhibits a remnant polarization having the same polarity. In that case, the phase shifts produced in the light propagated through the optical waveguide branch will cancel each other and desired high optical modulation efficiency cannot be achieved. This is because the phase shift produced in the light being propagated through the first half of the optical waveguide branch 22a or 22b under the first half of the line 23a or 23b of the parallel coupled line structure 23 is reverse to that produced in the light being propagated through the second half of the optical waveguide branch 22a or 22b under the second half of the line 23a or 23b of the parallel coupled line structure 23. In the optical modulator of this preferred embodiment, however, the substrate domain 21b located under the first half of the parallel coupled line structure 23 and the substrate domain 21a located under the second half of the parallel coupled line structure 23 have electro-optic coefficients having mutually opposite signs. Thus, as indicated by the dashed curve in FIG. 15C, even while the light is being propagated through the second half of the optical waveguide branch 22a or 22b under the second half of the line 23a or 23b of the parallel coupled line structure 23, the light is also subjected to substantially the same phase modulation as the light being propagated through the first half of the optical waveguide branch 22a or 22b although the electric fields applied in the first and second halves actually have mutually opposite signs. Consequently, the phase shifts, produced in the light being propagated through, and modulated by, the optical waveguide branch 22a or 22b under the line 23a or 23b of the parallel coupled line structure 23, do not cancel each other but are added together, thus achieving desired high optical modulation efficiency.

In the foregoing description, the transit time of the light is not taken into consideration. In an actual optical modulator, however, the electric field strength is sensed by the light differently from the solid curve shown in FIG. 15C because the velocity of light is finite. Accordingly, strictly speaking, the best pattern of the domain 21a is different from that shown in FIG. 15B. Specifically, the substrate domain 21a is preferably slightly shifted rightward (or downstream) with respect to the beginning of the second half of the lines 23a and 23b by a distance corresponding to the phase lag of the RF signal.

It should be noted that the remnant polarization does not have to be reversed over the entire area of the domain 21a as shown in FIG. 15B. It is only necessary to reverse the remnant polarization just under the two optical waveguide branches 22a and 22b and minimum required areas surrounding the branches 22a and 22b.

In the optical modulator of this preferred embodiment, the substrate 21 is provided with two domains 21a and 21b having electro-optic coefficients with the opposite signs by utilizing the difference in the direction of remnant polarization. Thus, the phase shifts, produced in the light being propagated through, and modulated by, the first and second halves of the optical waveguide branch 22a or 22b, never cancel each other but are added together. That is to say, in this preferred embodiment, the effects of the first preferred embodiment, obtained by providing the ½ wave resonator with both ends of the lines 13a and 13b connected together, can be achieved by providing those two substrate domains 21a and 21b exhibiting remnant polarizations with mutually opposite polarities. As a result, desired high optical modulation efficiency is also achieved.

The optical modulator of this second preferred embodiment includes the parallel coupled line structure 23 that functions as a half wave resonator with both ends opened. However, the present invention is in no way limited to such a specific preferred embodiment. For example, a parallel coupled line structure, functioning as a full wave resonator, may be provided by connecting both ends of the lines together by way of connector lines as in the first preferred embodiment described above but the first and second halves of an optical waveguide on first and second substrate domains, associated with the first and second halves of the lines of the parallel coupled line structure, may exhibit remnant polarizations with mutually opposite polarities. Even so, the phase shifts resulting from optical modulation for one wavelength do not cancel each other but can be added together. Supposing that the frequency is the same, the optical modulator of this preferred embodiment has a resonator that is approximately twice as long as that of the optical modulator shown in FIG. 4A, thus increasing the optical modulation efficiency. Furthermore, when higher-order resonance is produced, the optical modulation efficiency can be further increased.

By utilizing such an odd-mode high-order resonance as described above, the optical modulation efficiency can be increased significantly. If the difference in the polarity of remnant polarizations is utilized, even an optical modulator, of which the parallel coupled line structure is closed at one end but is opened at the other end, can also achieve similar effects.

It should be noted that the number of substrate domains in which the polarity of the remnant polarization is reversed is not necessarily one but may be determined appropriately. By arranging an appropriate number of such polarization-reversed domains, the length of the modulating electrode can be increased.

Embodiment 3

Figure 16A:
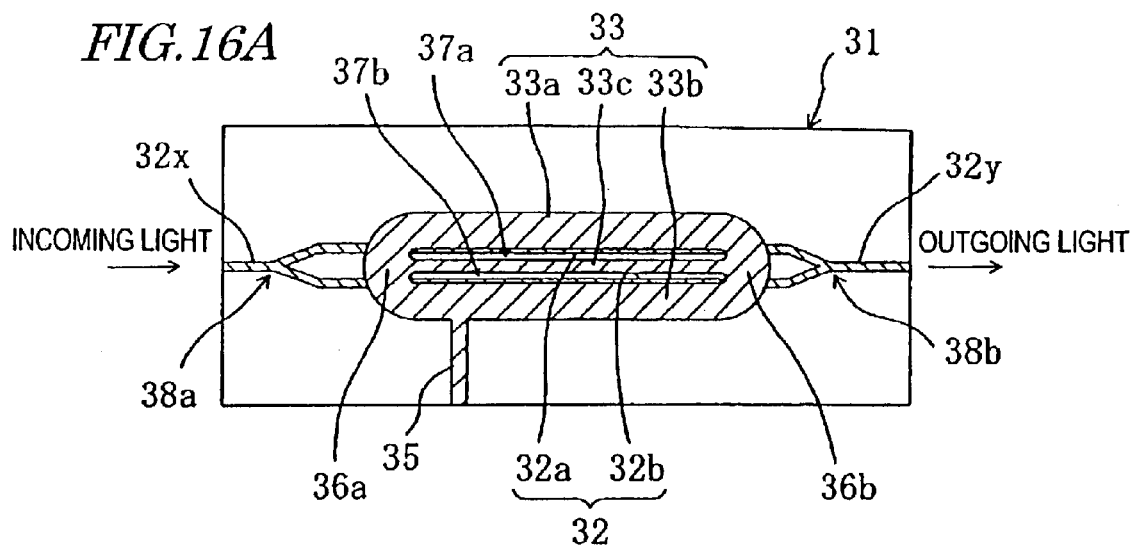
FIG. 16A is a plan view showing a layout for an optical modulator according to a third specific preferred embodiment of the present invention.
Figure 16B:
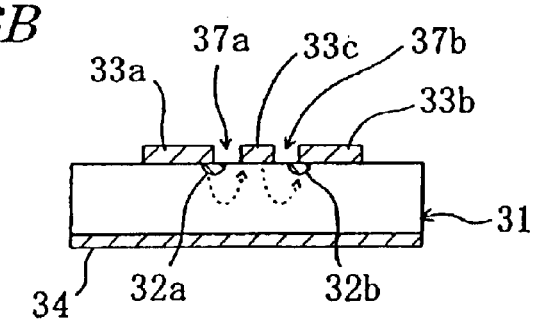
FIG. 16B is a vertical cross-sectional view of the optical modulator shown in FIG. 16A in a situation where resonance has been produced in Mode 2.

Hereinafter, an optical modulator according to a third specific preferred embodiment of the present invention will be described with reference to FIGS. 16A and 16B. FIG. 16A shows a planar layout for the optical modulator of this third preferred embodiment. FIG. 16B is a vertical cross-sectional view thereof.

As shown in FIG. 16A, the optical modulator of this preferred embodiment includes an optical waveguide 32, which may be formed on the surface of a substrate 31 by a proton exchange process using benzoic acid, for example. The substrate 31 is preferably made of an electro-optic material such as lithium tantalate ($LiTaO_3$) single crystals or lithium niobate ($LiNbO_3$) single crystals. The optical waveguide 32 is divided into two optical waveguide branches 32a and 32b at two branching points 38a and 38b. In this optical waveguide 32, incoming light is input through an optical input portion 32x thereof and then split into two light beams at the former branching point 38a. Next, the two light beams are passed through the two optical waveguide branches 32a and 32b, respectively, and then combined together at the latter branching point 38b. Thereafter, the combined light travels through the common optical output portion 32y toward the outlet port.

A parallel coupled line structure 33, including three lines 33a, 33b and 33c that extend along the optical waveguide branches 32a and 32b of the optical waveguide 32, is provided on the substrate 31. These three lines 33a, 33b and 33c are arranged such that each of the two outer lines 33a and 33b has its inner edge positioned right over the centerline of its associated optical waveguide branch 32a or 32b and that the inner line 33c is positioned substantially on the centerline between the two outer lines 33a and 33b. These three lines 33a, 33b and 33c are connected together at both ends thereof by way of connector lines 36a and 36b. An input line 35 is further provided on the substrate 31 and connected to one line 33b of the parallel coupled line structure 33. An electric signal (i.e., an RF signal) is supplied through this input line 35 to produce resonance in the parallel coupled line structure 33. The three lines 33a, 33b and 33c of the parallel coupled line structure 33, the connector lines 36a and 36b and the input line 35 are preferably obtained by depositing a film of aluminum, gold or any other suitable metal by an evaporation process and then patterning the film by photolithographic and etching techniques, for example. A ground plane (i.e., a grounded conductive layer) 34 is preferably formed by a similar process on the back surface of the substrate 31.

The incoming light, which has been introduced through the optical input portion 32x of the optical waveguide 32, is subjected to the following modulation while being propagated through the two optical waveguide branches 32a and 32b.

The input of an RF signal to the input line 35 causes resonance in the respective lines 33a, 33b and 33c of the parallel coupled line structure 33. Once that resonance has been set up, an electric field is created in the gaps 37a and 37b of the parallel coupled line structure 33 as pointed by the dashed arrows in FIG. 16B. Then, the refractive index of the material of the optical waveguide branches 32a and 32b changes with the electric field strength due to electro-optical effects. As a result, at the optical output portion 32y of the optical waveguide 32, the light beams that have been transmitted through the two optical waveguide branches 32a and 32b interfere with each other. This interference changes the intensity of the outgoing light eventually. In this manner, the optical modulator of this preferred embodiment operates as a light intensity modulator.

The parallel coupled line structure 33 including the three lines 33a, 33b and 33c as shown in FIGS. 16A and 16B normally has the following three propagation modes:

TABLE 1

|  | Line 33a | Line 33b | Line 33c |
|---|---|---|---|
| Mode 1 | + | + | + |
| Mode 2 | + | 0 | − |
| Mode 3 | + | − | + | where +, − and 0 denote the signs of potentials on the respective lines 33a, 33b and 33c in those three modes.

FIG. 16B shows the directions of electric fields created around the optical waveguide branches 32a and 32b in a situation where resonance has been produced in Mode 2 shown in Table 1. As can be seen from FIG. 16B, an electric field is applied downward to one optical waveguide branch 32a but another electric field is applied upward to the other optical waveguide branch 32b. Thus, a phase difference is created between the light waves that have been propagated through the two optical waveguide branches 32a and 32b to produce interference at the optical output portion 32y of the optical waveguide 32. Thus, the optical modulator of this preferred embodiment can function as a light intensity modulator.

Figure 16C:
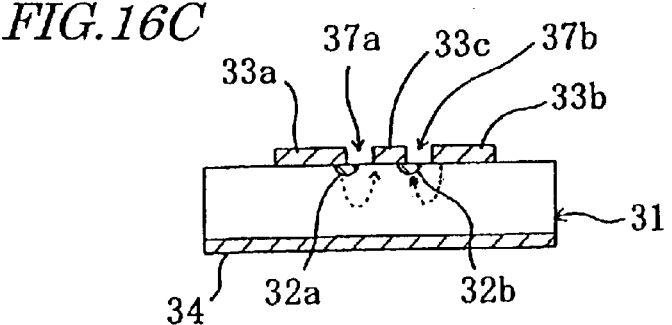
FIG. 16C is a vertical cross-sectional view of the optical modulator shown in FIG. 16A in a situation where resonance has been produced in Mode 3.

On the other hand, FIG. 16C shows the directions of electric fields created around the optical waveguide branches 32a and 32b in a situation where resonance has been produced in Mode 3 shown in Table 1. In producing resonance in Mode 3, the positional relationship between the optical waveguide branches 32a and 32b and the three lines 33a, 33b and 33c is slightly different from that shown in FIGS. 16A and 16B. More specifically, the optical waveguide branch 32b is shifted such that the electric fields created around the optical waveguide branches 32a and 32b have mutually opposite directions.

As described above, in Mode 1 in which all of the lines 33a, 33b and 33c always have the same potential, the optical modulator of this preferred embodiment does not function as a light intensity modulator. Thus, the optical modulator of this preferred embodiment is designed so as to produce resonance in Mode 2 or 3, not in Mode 1.

In this case, the gap between the two optical waveguide branches 32a and 32b cannot be so narrow to avoid the coupling of the light waves. However, due to the presence of the intermediate line 33c, the width of the gaps 37a and 37b becomes much narrower than that of the first or second preferred embodiment described above. Thus, an electric field having an extremely high strength is created in the gaps 37a and 37b. As a result, the optical modulator of this preferred embodiment achieves desired high optical modulation efficiency.

Figure 1A:
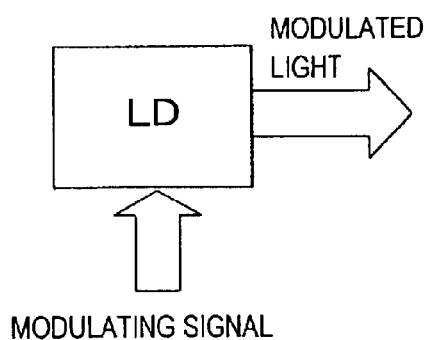
FIGS. 1A and 1B are schematic representations respectively showing the basic ideas of direct modulation and external modulation of light.
Figure 1B:
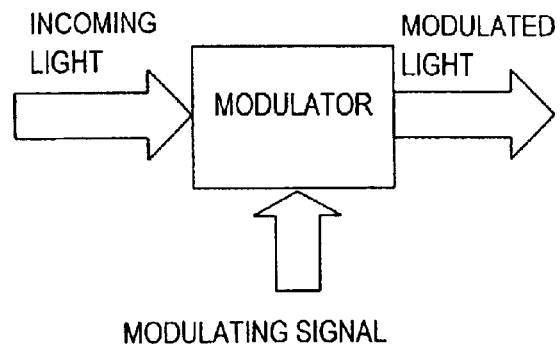
Figure 2:
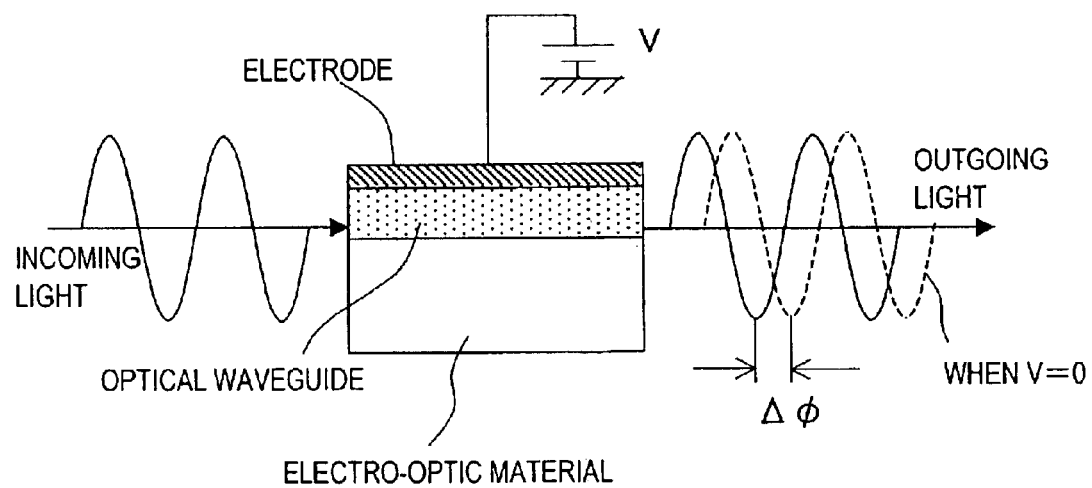
FIG. 2 schematically shows how an optical modulator operates as an external modulator by utilizing electro-optical effects.
Figure 3:
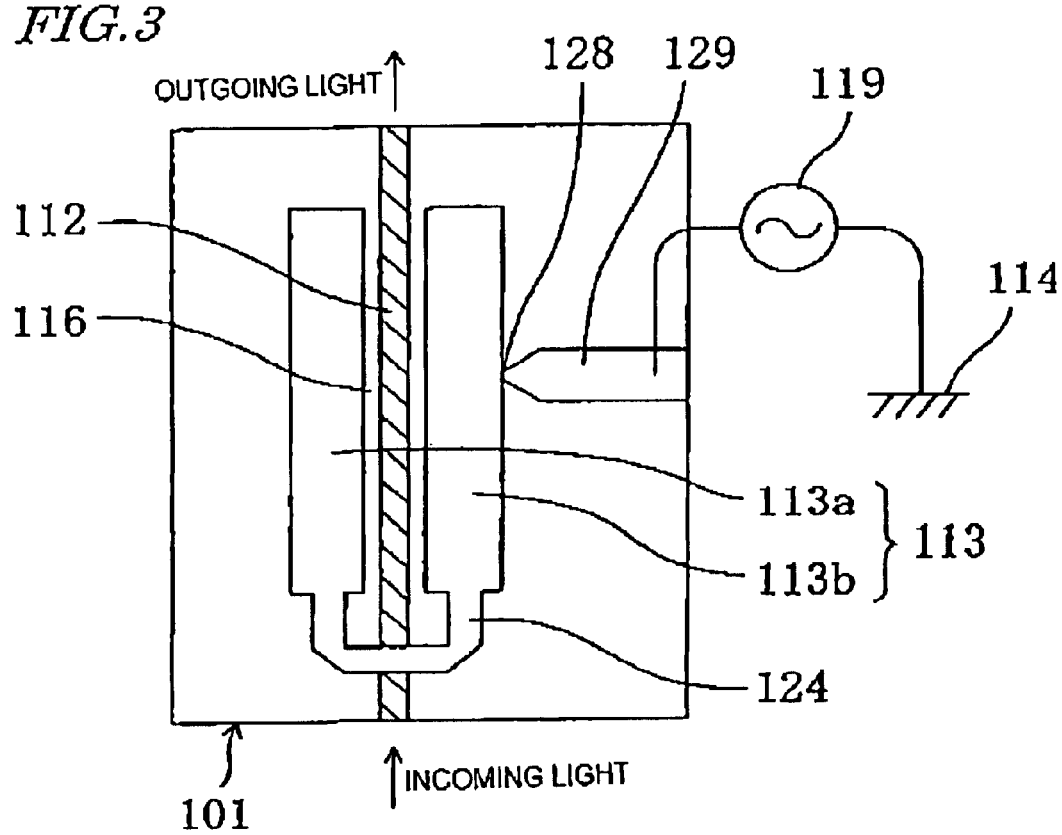
FIG. 3 is a plan view illustrating a conventional optical modulator.

The optical modulator of this third preferred embodiment includes the parallel coupled line structure 33 functioning as a half wave resonator with closed ends. However, the present invention is in no way limited to such a specific preferred embodiment. The effects of this preferred embodiment are also basically achievable by the optical modulator of the second preferred embodiment, including the parallel coupled line structure with open ends, or even by the conventional optical modulator including the parallel coupled line structure functioning as a ¼ wave resonator with one closed end and one open end as shown in FIG. 3.

Also, in the optical modulator of this preferred embodiment, a portion of the optical waveguide may have a reversed-polarization area as in the second preferred embodiment described above. By providing two domains exhibiting remnant polarizations with mutually opposite polarities for the substrate, the effects of the second and third preferred embodiments of the present invention are achievable in combination.

Embodiment 4

Hereinafter, an optical modulator according to a fourth specific preferred embodiment of the present invention will be described with reference to FIGS. 17A through 17C. FIG. 17A is a plan view showing a layout for the optical modulator of this fourth preferred embodiment. FIG. 17B is a cross-sectional view of the optical modulator as viewed on the plane XVIIb—XVIIb shown in FIG. 17A. FIG. 17C is a perspective view showing a portion of the optical modulator on a larger scale.

As shown in FIGS. 17A and 17B, the optical modulator of this preferred embodiment includes a first substrate-fixing jig 212a, in which a coaxial connector 209 is fitted, and a second substrate-fixing jig 212b, on which a substrate 11 is supported. The first jig 212a is fixed (e.g., screwed up) onto the second jig 212b such that the core conductor 210 of the coaxial connector 209 is located at an appropriate position with respect to an input line 15.

An interconnecting member 211 is attached to the end of the coaxial connector core conductor 210, thereby connecting the core conductor 210 to the input line 15. In the optical modulator of this preferred embodiment, the electric signal input section thereof includes not only the input line 15 but also the coaxial connector 209 and interconnecting member 211 unlike the optical modulator of the first, second or third preferred embodiment described above.

In this preferred embodiment, the coaxial connector of the optical modulator may be connected to an external driver, which generates an RF modulating signal, by way of a coaxial cable, for example. The RF signal is transmitted through the coaxial cable and then input to the input line 15 by way of the interconnecting member 211.

As shown in FIG. 17C, the interconnecting member 211 includes a first connecting portion 214 and a second connecting portion 215. The first connecting portion 214 is upwardly bent circularly so as to closely contact with the outer circumference of the coaxial connector core conductor 210. The second connecting portion 215 is a flat portion that contacts with the input line 15.

The remaining portion of the interconnecting member 211, which joins the first and second connecting portions 214 and 215 together, is preferably made of an elastic material. By using such an elastic portion, elastic force may be applied downward onto the second connecting portion 215 with respect to the first connecting portion 214. Thus, as shown in FIG. 17B, the bottom of the second connecting portion 215 presses the upper surface of the input line 15, thereby establishing electrical contact between the second connecting portion 215 and the input line 15 more easily. In such an arrangement, the second connecting portion 215 can be electrically connected to the input line 15 more easily without applying any conductive adhesive between the second connecting portion 215 and the input line 15. It should be noted that the first and second connecting portions 214 and 215 are preferably made of a single plate conductor.

In the optical modulator having such a configuration, an RF signal is input to the input line 15 by way of the coaxial connector 209 and then propagated through the parallel coupled line structure 13, thereby producing resonance between the two lines 13a and 13b thereof. As a result, a high-frequency oscillating electric field is created in the gap 17. Thus, the refractive index of the optical waveguide 12, made of an electro-optic material, changes with the RF signal. In this case, downward and upward electric fields are applied onto the optical waveguide branches under the lines 13a and 13b of the parallel coupled line structure 13 as shown in FIG. 17B. Consequently, a phase difference is created between the light waves that have been propagated through the two optical waveguide branches.

Figure 18:
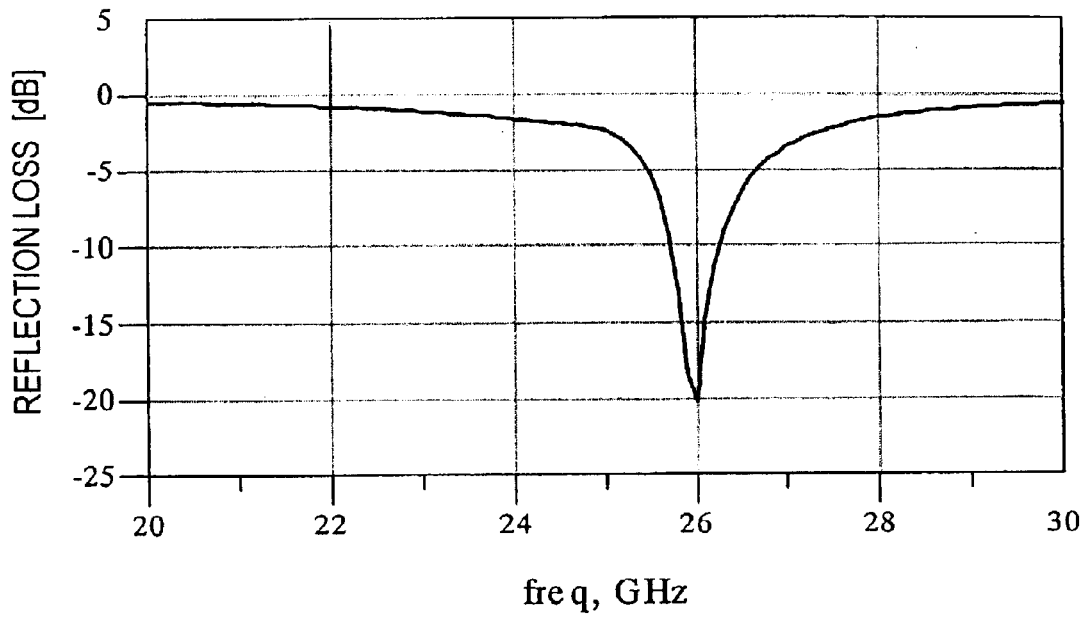
FIG. 18 is a graph showing the reflection characteristic at the input line in the optical modulator of the fourth preferred embodiment.
Figure 19:
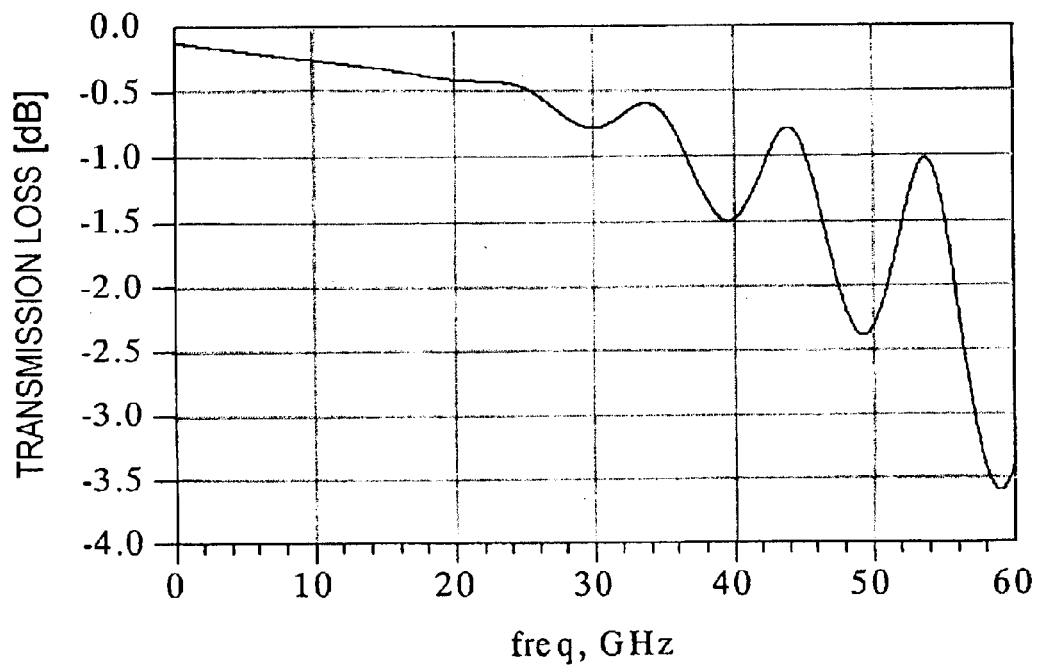
FIG. 19 is a graph showing the transmission loss at the input line in the optical modulator of the fourth preferred embodiment.

FIG. 18 shows the reflection characteristic of the optical modulator of this preferred embodiment at the end P of the input line 15. As shown in FIG. 18, the modulating electrode has a resonance frequency of 26 GHz, at which the input impedances are matched with each other. FIG. 19 is a graph showing how the transmission loss changes with the frequency of the RF signal that has been input to the input line 15.

Embodiment 5

Hereinafter, an optical modulator according to a fifth specific preferred embodiment of the present invention will be described.

The optical modulator of this fifth preferred embodiment has the same configuration as the counterpart of the fourth preferred embodiment described above except that no input line is provided on the substrate 11.

Figure 20A:
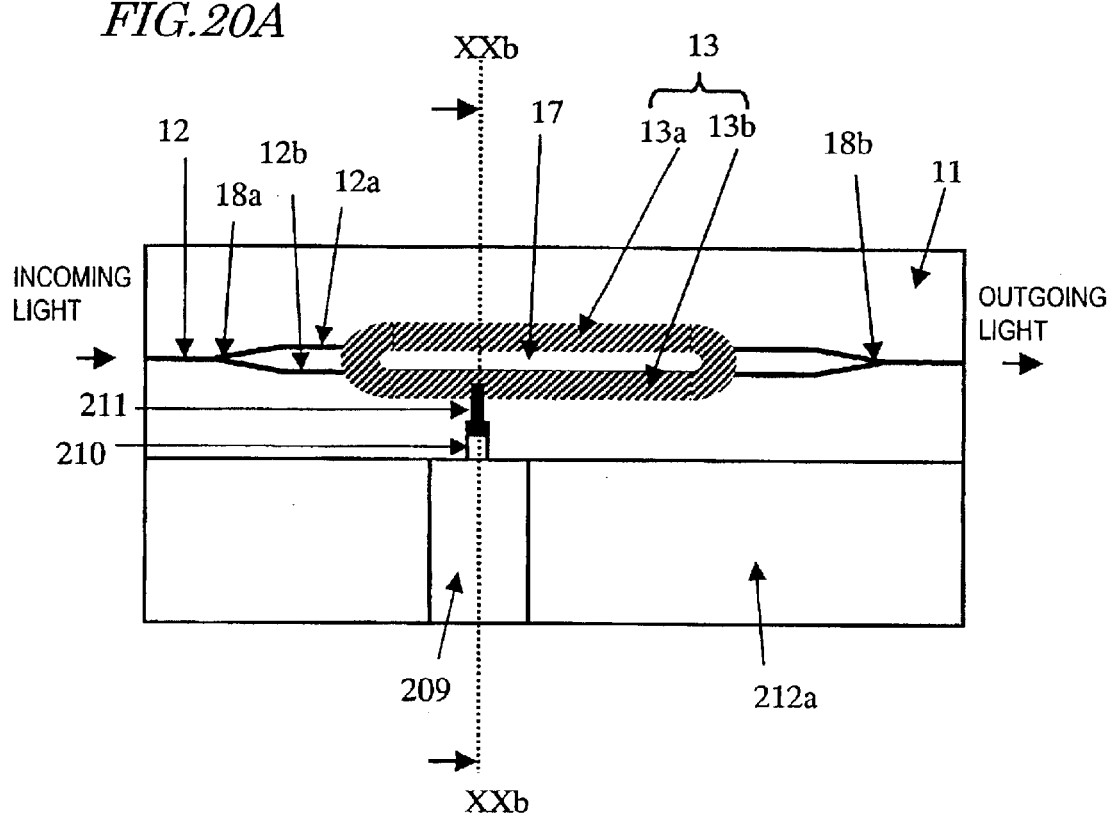
FIG. 20A is a plan view showing a layout for an optical modulator according to a fifth specific preferred embodiment of the present invention.
Figure 20B:
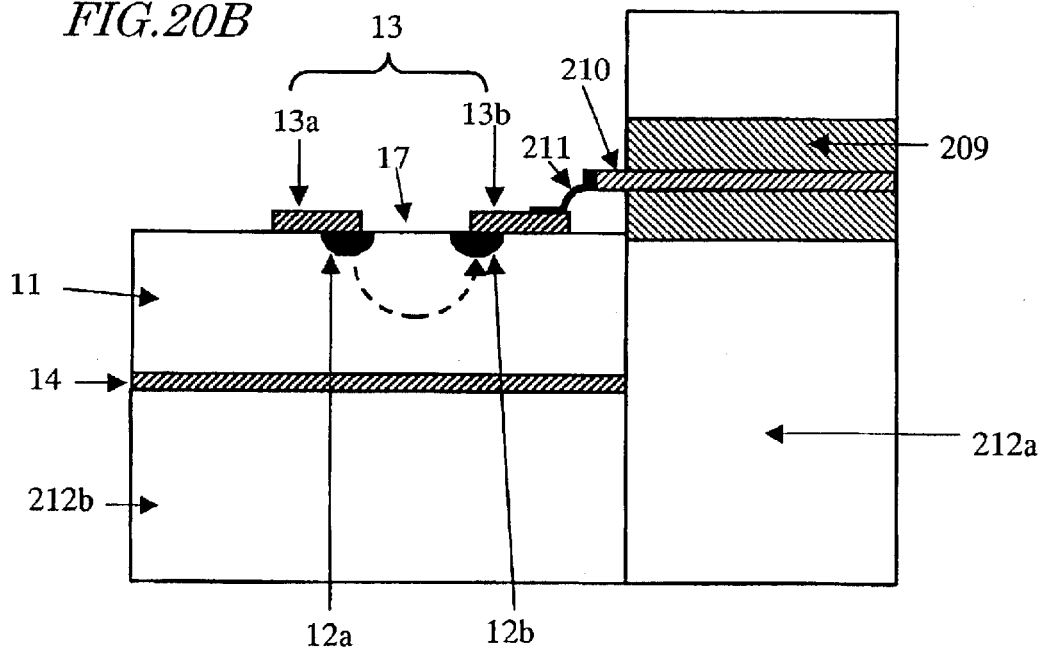
FIG. 20B is a cross-sectional view of the optical modulator as viewed on the plane XXb—XXb shown in FIG. 20A.

FIG. 20A is a plan view showing a layout for the optical modulator of this fifth preferred embodiment, and FIG. 20B is a cross-sectional view of the optical modulator as viewed on the plane XXb—XXb shown in FIG. 20A.

As in the fourth preferred embodiment described above, the electric signal input section of the optical modulator of this fifth preferred embodiment also includes the coaxial connector 209 and the interconnecting member 211. In this fifth preferred embodiment, however, the interconnecting member 211 is directly connected electrically to the modulating electrode 13 with no input line interposed between them.

To operate the optical modulator, odd-mode resonance needs to be produced efficiently in the parallel coupled line structure 13 by supplying an RF modulating signal to the parallel coupled line structure 13. The odd-mode resonance can be set up by connecting the interconnecting member 211 to a position where input impedances can be matched with each other.

Figure 21:
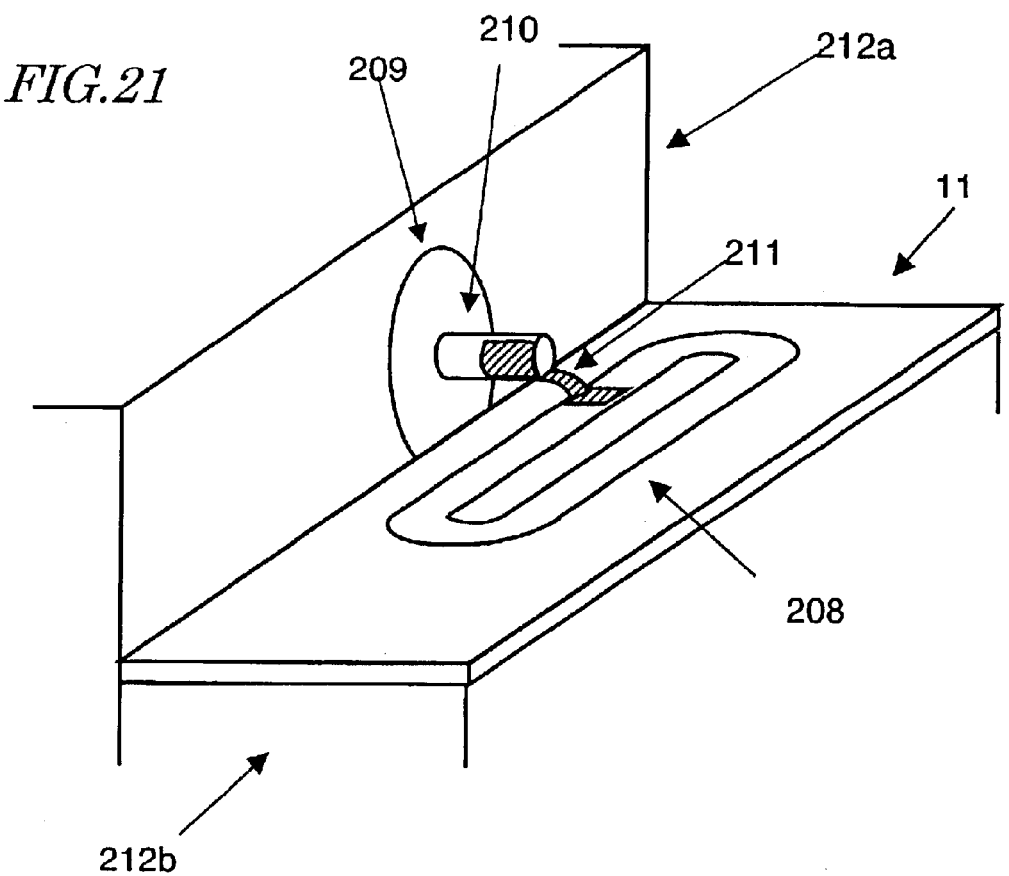
FIG. 21 is a perspective view showing a portion of the optical modulator of the fifth preferred embodiment.

FIG. 21 is a perspective view illustrating how the coaxial connector core conductor 210 may be connected to the parallel coupled line structure 13 on the substrate 11. The coaxial connector core conductor 210 and the interconnecting member 211 may have the configurations shown in FIG. 17C. As described above, the junction between the first and second connecting portions 214 and 215 is a curved elastic portion that applies an elastic force downward onto the second connecting portion 215 with respect to the first connecting portion 214. Thus, as shown in FIG. 21, the bottom of the second connecting portion 215 presses the upper surface of the parallel coupled line structure 13, thereby establishing electrical contact between the second connecting portion 215 and the parallel coupled line structure 13. In such an arrangement, the second connecting portion 215 can be electrically connected to the parallel coupled line structure 13 easily without applying any conductive adhesive between the second connecting portion 215 and the parallel coupled line structure 13.

As shown in FIG. 21, the substrate 11 including the parallel coupled line structure 13 thereon is supported on the second substrate-fixing jig 212b. On the other hand, the interconnecting member 211 and the coaxial connector 209 are fitted in the first substrate-fixing jig 212a. By sliding the first substrate-fixing jig 212a relative to the second substrate-fixing jig 212b, the parallel coupled line structure 13 and the interconnecting member 211 can electrically contact with each other at an appropriate position. For example, the first substrate-fixing jig 212a may be screwed up onto the second substrate-fixing jig 212b.

In this preferred embodiment, the RF modulating signal can be input to the optical modulator just by contacting the interconnecting member 211 with the parallel coupled line structure 13. Thus, even after the input reflection characteristic of the parallel coupled line structure 13 has been measured, the connecting point of the interconnecting member 211 to the parallel coupled line structure 13 can also be adjusted easily. The connecting point may be finely adjusted by slightly shifting the position at which the first and second jigs 212a and 212b are screwed up together.

The present inventors analyzed the performance of the optical modulator of this preferred embodiment by electromagnetic field simulations. The results will be described below. In a specific example, the substrate 11 was made of z-cut lithium tantalate crystals (with a dielectric constant of 42 and) with a thickness about 0.400 mm. The parallel coupled line structure 13 had a line width of about 0.05 mm and the gap thereof had a width of about 0.02 mm.

Those lines were made of an aluminum film with a thickness of about 1 μm. The interconnecting member was made of gold-plated beryllium-copper alloy with a thickness of about 0.01 mm and a width of about 0.15 mm.

The length of the parallel coupled line structure 13 and the connecting point at which the interconnecting member 211 was connected to the line 13 were determined with an electromagnetic field simulator such that the odd-mode resonance was set up at a frequency of about 26 GHz and that the reflection of the signal that had been input to the coaxial connector 209 was minimized at that frequency (i.e., such that the input impedances were matched with each other).

Figure 22:
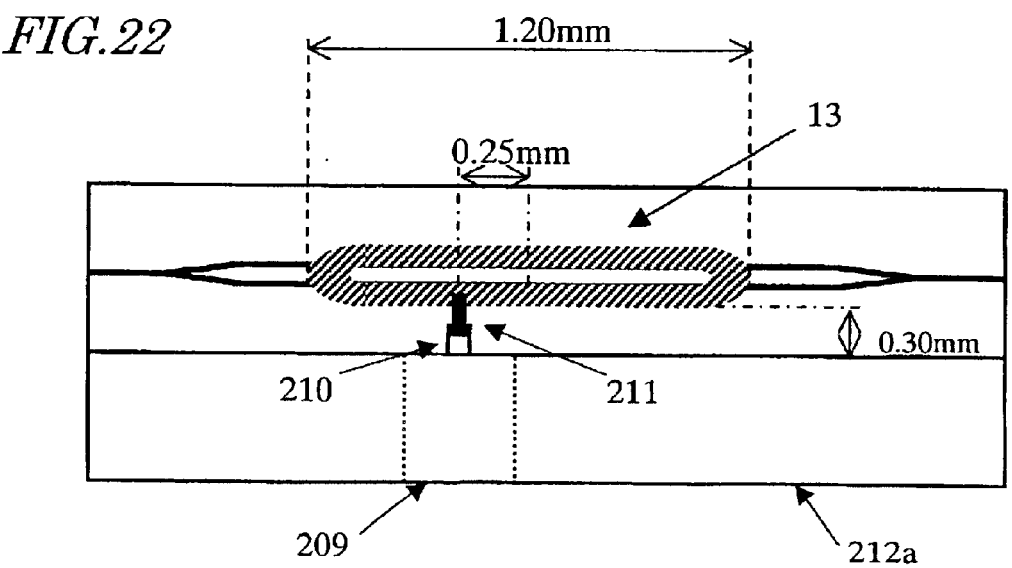
FIG. 22 is a plan view showing a layout for the optical modulator of the fifth preferred embodiment along with exemplary design parameter values.

As a result, the parallel coupled line structure 13 had a length of about 1.20 mm and the interconnecting member 211 was a connected at a point that was about 0.25 mm away from the midpoint of the parallel coupled line structure 13 as shown in FIG. 22. Also, the distance from the substrate-fixing jig 212a to the parallel coupled line structure 13 was about 0.30 mm.

Figure 23:
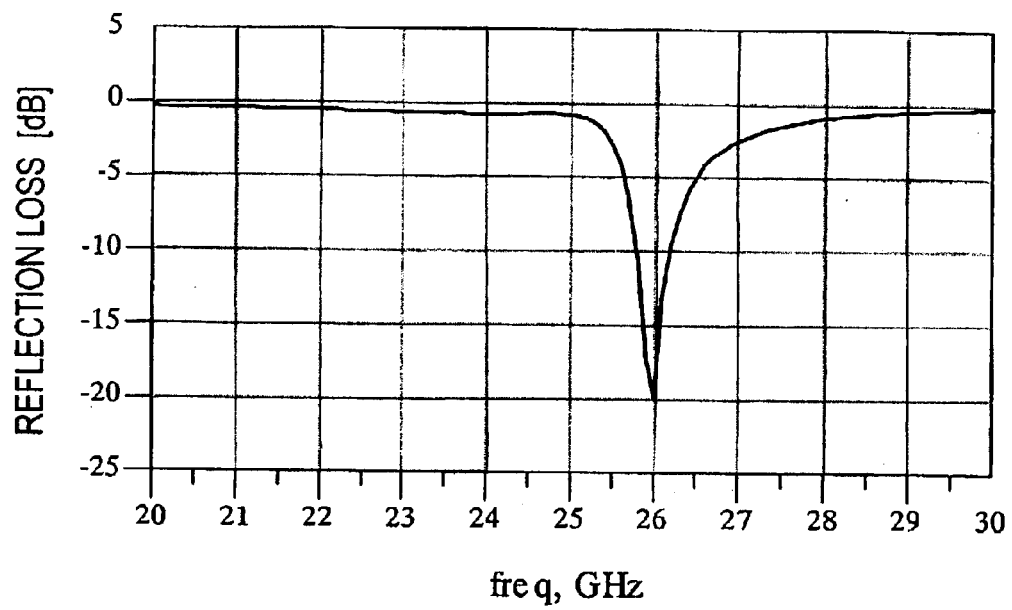
FIG. 23 is a graph showing the results of simulations that were carried out on the optical modulator shown in FIG. 22.

FIG. 23 shows the reflection characteristic of the optical modulator having such a configuration at the point where the interconnecting member 211 was connected to the parallel coupled line structure 13. As can be seen from FIG. 23, no signal was reflected anymore, and almost all signal power was input to the parallel coupled line structure 13 successfully, at the resonance point. It can also be seen that even when no input line was provided, the resonance characteristic hardly changed.

Thus, the optical modulator of this preferred embodiment can eliminate the transmission loss that is normally caused by the input line.

The optical modulator of the fourth preferred embodiment described above caused a transmission loss of about 0.5 dB at the frequency of 26 GHz due to the presence of the input line 15. However, according to this preferred embodiment, the RF signal can be input almost fully without causing such transmission loss by the input line and the optical modulation efficiency can be further increased. Accordingly, compared to the embodiment including the input line, the electric power required to increase the optical output from zero to its maximum value can be decreased by about 0.5 dB.

Figure 24:
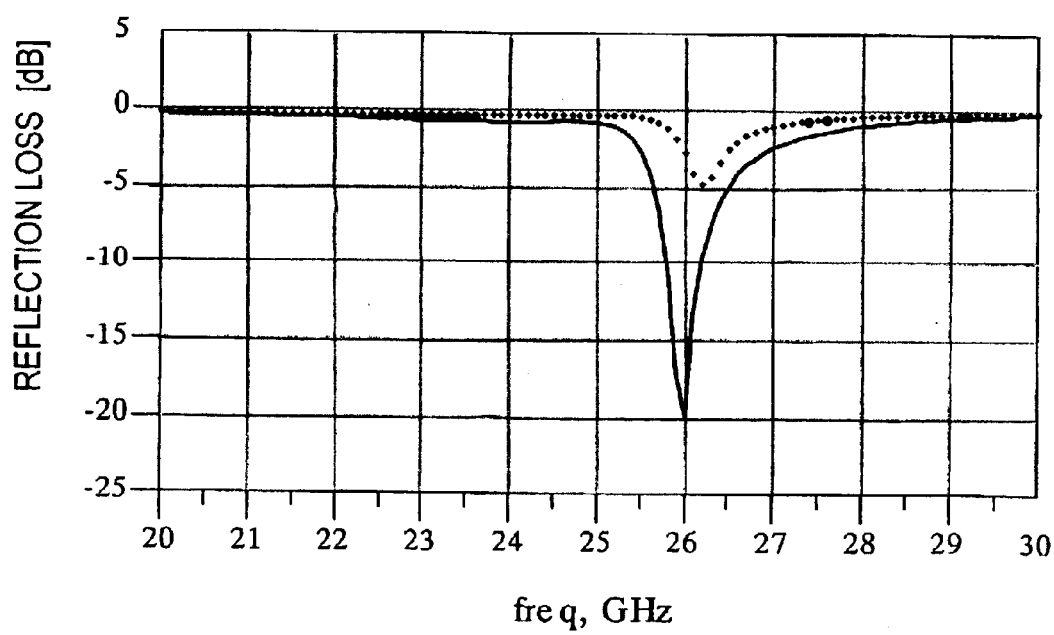
FIG. 24 is a graph showing the results of simulations that were carried out on the optical modulator shown in FIG. 22.

Suppose the optical modulator of this preferred embodiment exhibited the input reflection characteristic as represented by the dashed curve in FIG. 24 just after the optical modulator was completed according to the design values shown in FIG. 22. In that case, the modified input reflection characteristic as represented by the solid curve in FIG. 24 can be achieved just by shifting the connecting point of the interconnecting member 211 with the parallel coupled line structure 13 toward the midpoint of the modulating electrode by about 0.05 mm. That is to say, even if the input impedance has shifted from its design value due to some process-induced variation just after the optical modulator is completed, the input impedance can still be matched with the desired value easily just by finely adjusting the connecting point of the interconnecting member 211 with the parallel coupled line structure 13.

According to this preferred embodiment, the signal can be input to the modulating electrode and the optical modulation efficiency can be increased without providing any input line. Also, even just after the optical modulator is completed, the input impedance of the modulating electrode can still be matched with its desired value.

The optical modulator of the fifth preferred embodiment includes the modulating electrode functioning as a half wave resonator with closed ends. However, the present invention is in no way limited to such a specific preferred embodiment. Alternatively, any other modulating electrode with some resonator structure may also be used.

In the preferred embodiments of the present invention described above, the optical waveguide is formed on the surface of the substrate made of an electro-optic material. However, the present invention is not limited to those specific preferred embodiments, either. Alternatively, a core portion having a higher refractive index than its surrounding portion may be formed on the surface of the substrate and a cladding portion, made of an electro-optic material, may be provided on the core portion. In that case, the light being propagated through the core portion partially leaks into the cladding portion. Accordingly, by changing the refractive index of the cladding portion, the phase of the light being propagated through the core portion can be modulated. The core portion does not have to be made of an electro-optic material.

Also, in the preferred embodiments described above, the optical waveguide has a Mach-Zehnder interferometer type configuration including at least two optical waveguide branches, an optical input portion that combines the two branches together, and an optical output portion that also combines the two branches together. However, the optical modulator of the present invention is not limited to a light intensity modulator having such a configuration. For example, even if the optical waveguide of the optical modulator of the present invention includes no branches, the phase of the light being propagated can still be modulated effectively. In this sense, the essential function of the optical modulator of the present invention is to modulate the phase of light being propagated therethrough. And by allowing those phase-modulated light waves to interfere with each other, the optical modulator can also modulate the light intensity.

In the optical modulators of the first and second preferred embodiments described above, the optical waveguide is divided at a midpoint into two branches. However, the present invention is not limited to the optical modulator including such optical waveguide branches. For example, if the present invention is implemented as an optical modulator including an optical waveguide with no branches, the optical modulator can function as a phase modulator. Even so, according to the present invention, the voltage generated between the lines can have the same sign (or polarity) and the phase shifts produced in the light being propagated do not cancel each other. Thus, the optical modulator can exhibit increased optical modulation efficiency.

In the optical modulators of the first, second and third preferred embodiments described above, the input line is directly coupled to one of the two or three lines of the parallel coupled line structure. However, the present invention is in no way limited to such a specific preferred embodiment. Input coupling is also achievable by opposing the end of the input line to one of the multiple lines of the parallel coupled line structure with a gap provided between them, for example. This arrangement is very effective particularly when those lines cause relatively low loss and have a relatively high unloaded Q value in resonance (e.g., when those lines are made of a superconductor material).

In the drawings, the connector lines that connect the multiple lines of the parallel coupled line structure together are illustrated as being circular at least partially. However, those connector lines only need to connect the respective lines in a sufficiently short distance. Thus, the performance of the optical modulator is not affected even if the connector lines have linear portions (e.g., in a polygonal shape).

Furthermore, in the preferred embodiments described above, the substrate of the optical modulator is made of crystals of an electro-optic material such as lithium tantalate crystals or lithium niobate crystals. Alternatively, the substrate may also be made of crystals of any other electro-optic material. Also, in the preferred embodiments described above, the optical waveguide is preferably formed on the surface of the electro-optic crystal substrate by subjecting the substrate to a proton exchange process in benzoic acid. However, the optical waveguide may also be formed by any other process. For example, if a substrate made of such electro-optic crystals (e.g., lithium tantalate crystals) should not be used to integrate the optical modulator and other functional elements together on the same substrate, then a film of an electro-optic material having a higher refractive index than the substrate may be formed on the substrate and patterned into an alternative optical waveguide. As another alternative, a core portion having a higher refractive index than its surrounding portion may be formed on the surface of the substrate, and a film of an electro-optic material may be provided as a cladding portion on the core portion. Even so, optical modulation is also achievable effectively by utilizing variation in the refractive index of the cladding portion responsive to the electric field that has leaked out of the core portion. Furthermore, the parallel coupled line structure may also be embedded in the substrate.

Embodiment 6

Figure 25:
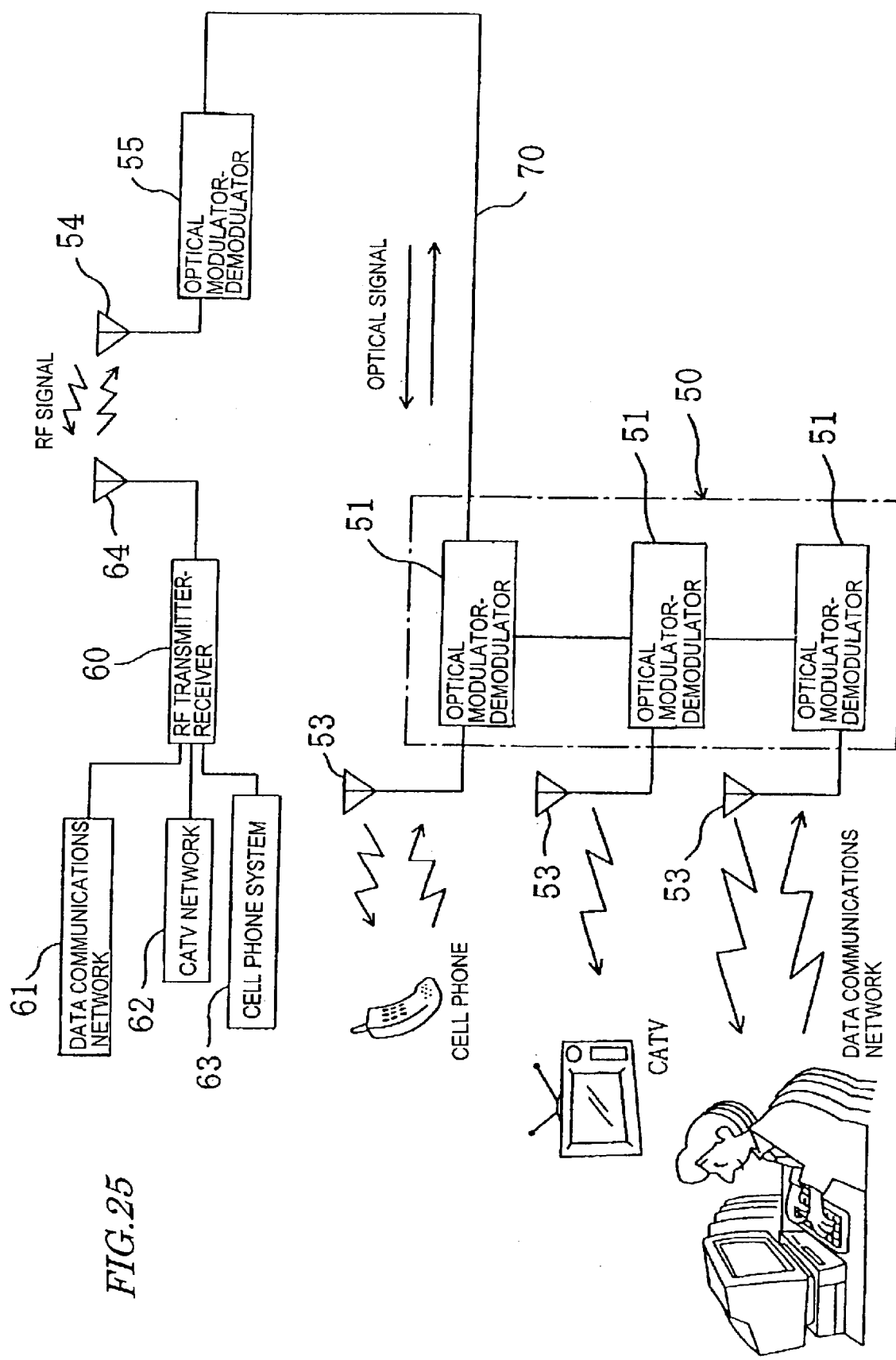
FIG. 25 is a block diagram showing the configuration of a fiber-optics transmission system according to a preferred embodiment of the present invention.

FIG. 25 is a block diagram showing the configuration of a fiber-optics transmission system according to a preferred embodiment of the present invention.

The fiber-optics transmission system 50 of this preferred embodiment includes multiple optical modulators-demodulators 51, each including the optical modulator of the first, second or third preferred embodiment of the present invention described above. In this transmission system, RF signals may be directly received from, or transmitted to, a data communications network such as the Internet, various mobile electronic devices such as cell phones, or a CATV network through antennas 53. These communications can be carried out on a carrier wave such as the milliwave. Each of those optical modulators-demodulators 51 includes not only the optical modulator but also an optical demodulator (such as a photodiode).

However, an RF signal having a high frequency falling within the milliwave band, for example, is normally hard to transfer completely over a long distance and is often blocked by some objects. Accordingly, communications with the data communications network 61, CATV network 62 or cell phone system 63 may also be carried out by way of an RF transmitter-receiver 60 including an antenna 64. In that case, an optical modulator-demodulator 55 with an antenna 54 needs to be connected to the fiber-optics transmission system 50 through fiber-optics bundles 70. Then, signals can be exchanged with the RF transmitter-receiver 60 by way of the antennas 54 and 64 and the optical modulator-demodulator 55. The optical modulator-demodulator 55 includes not only the optical modulator but also an optical demodulator (such as a photodiode).

In transmitting an optical signal either over a long distance or indoors through building walls, the optical signal is preferably modulated with an RF signal falling within the milliwave band, for example, before being propagated through the fiber-optics bundles 70.

According to various preferred embodiments of the present invention described above, the optical modulator, functioning as a phase modulator or an intensity modulator, achieves significantly increased optical modulation efficiency. Thus, by using such an optical modulator in an optical communications system, information can be exchanged very efficiently as an RF signal falling within the milliwave band, for example.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An optical modulator comprising:

an optical waveguide, at least a portion of which is made of an electro-optic material;

a modulating electrode including a first conductor line and a second conductor line, which are coupled together electromagnetically, and applying a modulating electric field to a portion of the optical waveguide;

a conductive layer, which forms a first microstrip line with the first conductor line and a second microstrip line with the second conductor line, respectively;

an electric signal input section, through which an RF modulating signal is supplied to the modulating electrode; and connector members, which connect the first and second conductor lines together at both ends thereof, wherein the first and second conductor lines function as an odd-mode resonator for the RF modulating signal.

2. The optical modulator of claim 1, wherein the optical waveguide includes:

at least two optical waveguide branches;

an optical input portion, which combines the two branches together; and an optical output portion, which also combines the two branches together, and wherein the portion of the optical waveguide, to which the modulating electric field is applied, is divided into the two optical waveguide branches, and wherein the modulating electrode is provided so as to apply electric fields with mutually opposite polarities to the two optical waveguide branches, respectively, and functions as an intensity modulator for modulating the intensity of light that has been input to the optical waveguide.

3. The optical modulator of claim 1, wherein the modulating electrode is provided so as to modulate the refractive index of the portion of the optical waveguide, to which the modulating electric field is applied, and functions as a phase modulator for modulating the phase of light that has been input to the optical waveguide.

4. The optical modulator of claim 1, wherein the optical waveguide includes at least two portions exhibiting remnant polarizations with mutually opposite polarities.

5. The optical modulator of claim 1, wherein the optical waveguide is provided in a substrate that is made of the electro-optic material.

6. The optical modulator of claim 1, wherein the electric signal input section includes an input line, which forms another microstrip line with the conductive layer, and
   wherein the input line is connected to one of the first and second conductor lines.

7. The optical modulator of claim 1, wherein the electric signal input section includes:
   a coaxial connector, which is connected to a line that propagates the RF modulating signal therethrough; and
   an interconnecting member, which electrically connects the coaxial connector and the modulating electrode together.

8. An optical modulator comprising:
   an optical waveguide, at least a portion of which is made of an electro-optic material;
   a modulating electrode including a first conductor line and a second conductor line, which are coupled together electromagnetically, and applying a modulating electric field to a portion of the optical waveguide;
   a conductive layer, which forms a first microstrip line with the first conductor line and a second microstrip line with the second conductor line, respectively; and
   an electric signal input section, through which an RF modulating signal is supplied to the modulating electrode,
   wherein the optical waveguide includes at least two portions exhibiting remnant polarizations with mutually opposite polarities, and
   wherein the first and second conductor lines function as an odd-mode resonator for the RF modulating signal.

9. The optical modulator of claim 8, wherein the optical waveguide includes:
   at least two optical waveguide branches;
   an optical input portion, which combines the two branches together; and
   an optical output portion, which also combines the two branches together, and
   wherein the portion of the optical waveguide, to which the modulating electric field is applied, is divided into the two optical waveguide branches, and
   wherein the first and second conductor lines are provided so as to apply electric fields with mutually opposite polarities to the two optical waveguide branches, respectively, and function as an intensity modulator for modulating the intensity of light that has been input to the optical waveguide.

10. The optical modulator of claim 8, wherein the modulating electrode is provided so as to modulate the refractive index of the portion of the optical waveguide, to which the modulating electric field is applied, and functions as a phase modulator for modulating the phase of light that has been input to the optical waveguide.

11. The optical modulator of claim 8, further comprising a connector member, which connects the first and second conductor lines together on at least one end thereof.

12. The optical modulator of claim 8, wherein the optical waveguide is provided in a substrate that is made of the electro-optic material.

13. The optical modulator of claim 8, wherein the electric signal input section includes an input line, which forms another microstrip line with the conductive layer, and
   wherein the input line is connected to one of the first and second conductor lines.

14. The optical modulator of claim 8, wherein the electric signal input section includes:
   a coaxial connector, which is connected to a line that propagates the RF modulating signal therethrough; and
   an interconnecting member, which electrically connects the coaxial connector and the modulating electrode together.

15. An optical modulator comprising:
   an optical waveguide, at least a portion of which is made of an electro-optic material;
   a modulating electrode including a first conductor line, a second conductor line and a third conductor line, which are coupled together electromagnetically, and applying a modulating electric field to a portion of the optical waveguide;
   a conductive layer, which forms a first microstrip line with the first conductor line, a second microstrip line with the second conductor line, and a third microstrip line with the third conductor line, respectively; and
   an electric signal input section, through which an RF modulating signal is supplied to the modulating electrode, wherein said first, second and third conductor lines function as a resonator for the RF modulating signal, the resonator producing a resonance in a selected one of the propagation modes.

16. The optical modulator of claim 15, wherein the optical waveguide includes:
   at least two optical waveguide branches;
   an optical input portion, which combines the two branches together; and
   an optical output portion, which also combines the two branches together, and
   wherein the portion of the optical waveguide, to which the modulating electric field is applied, is divided into the two optical waveguide branches, and
   wherein the first and second conductor lines are arranged so as to apply electric fields with mutually opposite polarities to one of the two optical waveguide branches, the second and third conductor lines are arranged so as to apply electric fields with mutually opposite polarities to the other optical waveguide branch, and the modulating electrode functions as an intensity modulator for modulating the intensity of light that has been input to the optical waveguide.

17. The optical modulator of claim 15, wherein the modulating electrode is provided so as to modulate the refractive index of the portion of the optical waveguide, to which the modulating electric field is applied, and functions as a phase modulator for modulating the phase of light that has been input to the optical waveguide.

18. The optical modulator of claim 15, further comprising a connector member, which connects the first, second and third conductor lines together on at least one end thereof.

19. The optical modulator of claim 15, wherein the optical waveguide includes at least two portions exhibiting remnant polarizations with mutually opposite polarities.

20. The optical modulator of claim 15, wherein the optical waveguide is provided in a substrate that is made of the electro-optic material.

21. The optical modulator of claim 15, wherein the electric signal input section includes an input line, which forms another microstrip line with the conductive layer, and wherein the input line is connected to one of the first and third conductor lines.

22. The optical modulator of claim 15, wherein the electric signal input section includes:

a coaxial connector, which is connected to a line that propagates the RF modulating signal therethrough; and an interconnecting member, which electrically connects the coaxial connector and the modulating electrode together.

23. A communications system comprising:

the optical modulator of claim 1;

an input section for inputting light to the optical modulator; and a control section for supplying the RF modulating signal to the optical modulator.

24. A communications system comprising:

the optical modulator of claim 8;

an input section for inputting light to the optical modulator; and a control section for supplying the RF modulating signal to the optical modulator.

25. A communications system comprising:

the optical modulator of claim 15;

an input section for inputting light to the optical modulator; and a control section for supplying the RF modulating signal to the optical modulator.

26. The optical modulator of claim 15, wherein the selected one of the propagation modes allows an electrical potential of the first and third conductor lines to have opposite polarity, while keeping an electric potential of the second conductor line that is placed between the first and second conductor lines to have a zero value.

27. The optical modulator of claim 15, wherein the selected one of the propagation modes allows an electrical potential of the first and third conductor lines to have the same polarity, while keeping an electric potential of the second conductor line that is placed between the first and second conductor lines to have the opposite polarity.

* * * * *